(12) United States Patent
Kamel

(10) Patent No.: US 8,424,374 B2
(45) Date of Patent: Apr. 23, 2013

(54) APPARATUS, SYSTEM AND METHOD FOR TRACKING A ROTATABLE OBJECT

(75) Inventor: John-Pierre Kamel, Toronto (CA)

(73) Assignee: BCE Inc., Verdun, Quebec (CA)

( * ) Notice: Subject to any disclaimer, the term of this patent is extended or adjusted under 35 U.S.C. 154(b) by 941 days.

(21) Appl. No.: 12/521,501

(22) PCT Filed: Dec. 28, 2006

(86) PCT No.: PCT/CA2006/002144
§ 371 (c)(1),
(2), (4) Date: Jun. 26, 2009

(87) PCT Pub. No.: WO2008/080211
PCT Pub. Date: Jul. 10, 2008

(65) Prior Publication Data
US 2010/0316316 A1 Dec. 16, 2010

(51) Int. Cl.
*G01M 15/00* (2006.01)

(52) U.S. Cl.
USPC ...................................................... 73/115.07

(58) Field of Classification Search ............... 73/115.07; 246/169 A
See application file for complete search history.

(56) References Cited

U.S. PATENT DOCUMENTS

| | | | | |
|---|---|---|---|---|
| 3,569,695 A * | 3/1971 | McLean | ..................... | 246/169 A |
| 4,696,446 A * | 9/1987 | Mochizuki et al. | ........ | 246/169 S |
| 4,696,466 A | 9/1987 | Yamasaki et al. | | |
| 5,218,367 A | 6/1993 | Sheffer et al. | | |
| 5,579,013 A | 11/1996 | Hershey et al. | | |
| 5,633,628 A * | 5/1997 | Denny et al. | ................... | 340/584 |
| 5,660,470 A * | 8/1997 | Mench | .......................... | 374/121 |
| 6,396,438 B1 | 5/2002 | Seal | | |
| 6,581,449 B1 | 6/2003 | Brown et al. | | |
| 6,724,301 B2 | 4/2004 | Ginman et al. | | |
| 6,759,963 B2 * | 7/2004 | Hayes | .......................... | 340/584 |
| 7,034,711 B2 * | 4/2006 | Sakatani et al. | ........... | 340/686.1 |
| 7,042,346 B2 | 5/2006 | Paulsen | | |
| 7,064,668 B2 | 6/2006 | Porad | | |
| 7,089,099 B2 | 8/2006 | Shostak et al. | | |
| 7,184,930 B2 * | 2/2007 | Miyasaka et al. | ............. | 702/183 |
| 7,497,131 B2 * | 3/2009 | Sentoku | .................... | 73/862.322 |
| 2003/0030565 A1 * | 2/2003 | Sakatani et al. | .............. | 340/679 |
| 2004/0190591 A1 | 9/2004 | Zhang | | |
| 2006/0107765 A1 * | 5/2006 | Sentoku | .................... | 73/862.322 |
| 2006/0180647 A1 | 8/2006 | Hansen | | |
| 2010/0315204 A1 * | 12/2010 | Kamel | ........................ | 340/10.51 |

FOREIGN PATENT DOCUMENTS

| | | |
|---|---|---|
| EP | 1 559 625 A1 | 8/2005 |
| JP | 2003003642 A | 1/2003 |

OTHER PUBLICATIONS

International Search Report mailed on Sep. 27, 2007 in connection with corresponding International Patent Application No. PCT/CA2006/002144.

(Continued)

*Primary Examiner* — Freddie Kirkland, III

(57) ABSTRACT

Embodiments of the present invention provide a method, system and apparatus for tracking a rotatable object. A device for tracking a rotatable object comprises a body, the body comprising a tracking portion. A device for tracking a rotatable object further comprises an attachment section connected to the body, for attaching the device to the rotatable object. The body and the attachment section are configured for balanced rotation when the rotatable object rotates.

57 Claims, 19 Drawing Sheets

OTHER PUBLICATIONS

Written Opinion of the International Searching Authority mailed on Sep. 27, 2007 in connection with corresponding International Patent Application No. PCT/CA2006/002144.

International Search Report mailed on Aug. 20, 2007 in connection with International Patent Application No. PCT/CA2006/002145.

Written Opinion of the International Searching Authority mailed on Aug. 20, 2007 in connection with International Patent Application No. PCT/CA2006/002145.

TagMaster, RAIL—How it works, http://www.tagmaster.se/applications/transportation/how.php, originally downloaded on Nov. 11, 2006.

Non-Final Office Action issued by the United States Patent and Trademark Office on Aug. 16, 2012 in connection with U.S. Appl. No. 12/521,506, 12 pages.

* cited by examiner

Wheel Assembly Component ID 1010: ABCD-1
Wheel Assembly Component 1020: Bearing Assembly

| | Date 1030 | Location 1040 | Event 1050 | Distance Traversed 1310 |
|---|---|---|---|---|
| 1 | April 1, 2006 | Factory Floor | Placed into Service | 0 |
| 2 | April 12, 2006 | Yonge/Bloor Train Crossing | Shock Event | 200 kms |
| 3 | April 16, 2006 | Bay Street Crossing | | 500 kms |
| 4 | April 16, 2006 | Chatham Ave Train Tracks | Known Area of Problem Track | 1100 kms |
| 5 | May 1, 2006 | Winnipeg Machine Shop | Bearings Machined | 0 kms |

1300

APPARATUS, SYSTEM AND METHOD FOR TRACKING A ROTATABLE OBJECT

FIELD OF THE INVENTION

This invention relates to an apparatus, system and method for tracking a rotatable object.

BACKGROUND OF THE INVENTION

Rotatable objects such as wheel assembly components are often a failure point on wheeled vehicles, such as rail cars, automobiles, trucks etc. In some vehicles, such as rail cars, wheel assemblies are attached to the vehicles via a bearing assembly component which extends from the face of the wheel. The vehicle rests on the bearing assembly which, along with the wheel assembly, supports the weight of the vehicle. Hence, much stress is placed on the wheel assembly and its components through this supporting function, and further stress is placed on the bearing assembly, and the various other components of the wheel assembly, via acceleration forces placed on the vehicle. Wheel assemblies are thus prone to seizing up, and may be a key failure point on the vehicles.

Maintenance of the wheel assembly components is thus an important aspect of vehicle maintenance, and rail car maintenance specifically. Further, an understanding of the history of each wheel assembly component can be a key factor in making decisions about the maintenance schedule of the wheel assembly component and the wheel assembly itself. For example, a wheel assembly component that has been in use for a long period of time may benefit from preventative maintenance. However, this may only be cost effective if it is done at an appropriate time, which requires a record to be maintained of how long the wheel assembly has been in use. Further, wheel assembly components which have been in higher than normal stress situations may also benefit from preventative maintenance. Examples of higher than normal stress situations might be an accident, undue vibration due to poorly maintained areas of track, or travel through harsh terrains and/or weather conditions. Another indicator that a wheel assembly component would benefit from maintenance is the temperature of a wheel assembly component that is in use or has recently been in use: wheel assembly components that contain worn, moving parts tend to heat up due to friction. An example of such a wheel assembly component is again a bearing assembly.

The history of the maintenance schedule of the wheel assembly component may also be a key factor in determining future maintenance schedules of the wheel assembly component. For example, a common procedure during maintenance is to machine the moving parts of a bearing assembly to reduce frictional stress. However, this can be an expensive procedure, in that the wheel assembly must be disassembled, as must the bearing assembly, and the machining must be precise. Further, a bearing assembly may accept only a limited number of these procedures throughout its life, as material is removed from the bearing assembly during the machining process. Hence, machining a bearing assembly is a procedure which might be performed only from time to time, and not as a routine procedure.

Hence, it is desirable to track the history of wheel assembly components, including both the in-use history of the wheel assembly component, as well as the maintenance history of the wheel assembly component, for making decisions about future maintenance schedules. Understanding the history of the wheel assembly component may also be beneficial in warranty tracking and management. One solution for tracking the maintenance history of a wheel assembly component has been to physically mark the wheel assembly components with an alpha-numeric identifier, such as an identification number, and then manually track the status of the wheel assembly component by recording events in the history of the wheel assembly component against the identification number. However, this solution relies on a maintenance worker remembering to record the identification number, and to cross reference events. Further, this does not address the problem of tracking the in-use history of the wheel assembly component. Returning again to the example of the bearing assembly, in situations where many rail cars are moving in and out of a maintenance yard, it is not practical to stop each train and check the number of each bearing assembly on each rail car.

There remains a need therefore for an improved apparatus, system and method, for tracking a rotatable object.

SUMMARY OF THE INVENTION

According to a first broad aspect, the present invention seeks to provide a device for tracking a rotatable object. The device comprises a body comprising a tracking portion and an attachment section connected to said body for attaching said device to the rotatable object. The body and the attachment section are configured for balanced rotation when the rotatable object rotates.

According to a second broad aspect, the present invention seeks to provide a system comprising a rotatable object and a tracking device attached to the rotatable object. The rotatable object comprises a face and a plate releasably attached to said face. The tracking device comprises a body comprising a tracking portion and an attachment section projecting from said body. According to the second broad aspect, at least a portion of said attachment section is clamped between said face and said plate with sufficient force to prevent said tracking device from being released while said rotatable object is rotating.

According to a third broad aspect, the present invention seeks to provide a method of attaching a tracking device to a rotatable object. In this aspect, the rotatable object comprises a face and a plate attachable to the face and the tracking device comprises an attachment section. The method comprises positioning at least a portion of the attachment section between the face and the plate and attaching the plate to the face to clamp the at least a portion of the attachment section between the face and the plate.

According to a fourth broad aspect, the present invention seeks to provide a method of refurbishing a bearing assembly. The method comprises disassembling the bearing assembly into a plurality of components; machining at least one of said components; and reassembling at least two of said components. In this broad aspect, the reassembling comprises clamping a tracking device between at least two of said components.

These and other aspects and features of the present invention will now become apparent to those of ordinary skill in the art upon review of the following description of specific embodiments of the invention in conjunction with the accompanying drawings.

BRIEF DESCRIPTIONS OF THE DRAWINGS

Embodiments of the present invention are described with reference to the following figures, in which:

FIG. 13 depicts a table of a database, according to an embodiment of the present invention;

DETAILED DESCRIPTION OF EMBODIMENTS

Figure 1:
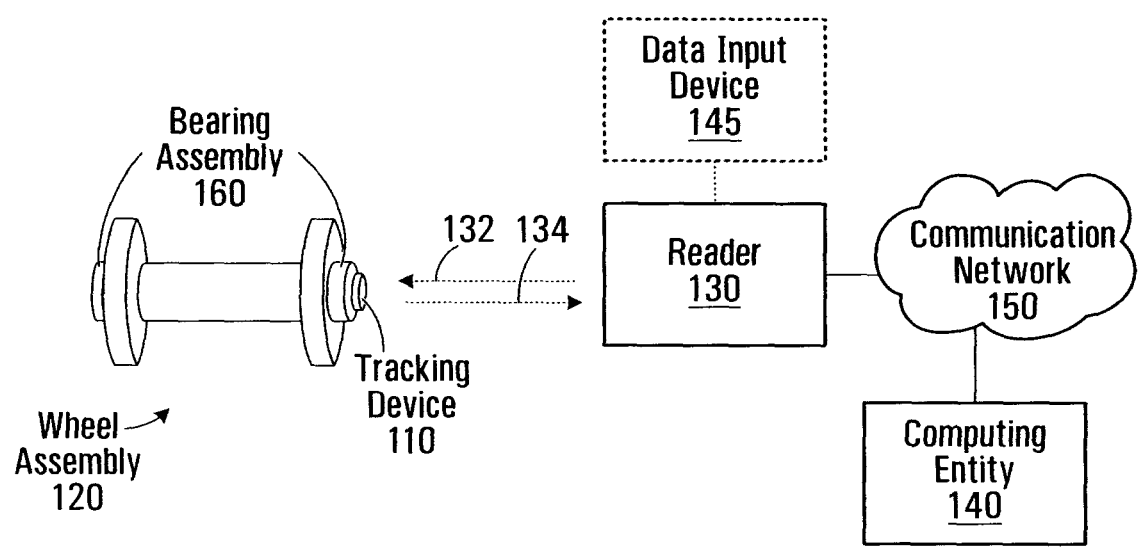
FIG. 1 depicts a system for tracking a wheel assembly component, according to an embodiment of the present invention.

FIG. 1 depicts a system for tracking a wheel assembly component, according to one embodiment of the present invention. A tracking device 110, for storing data associated with a wheel assembly component of a wheel assembly 120, is attached to a component of the wheel assembly 120. In this embodiment, the tracking device 110 is attached to at least one of a pair of bearing assemblies 160. A tracking device reader 130 is configured for contactless reading of data stored in the tracking device 110. In this embodiment, the tracking device reader 130 is located adjacent to an expected location of the bearing assembly 160. However, in other embodiments, the tracking device reader 130 may not be located adjacent to an expected location of the tracking device 110, as described below. The tracking device reader 130 is in communication with a computing entity 140, via a communication network 150, and is further configured to transmit data to the computing entity 140.

Figure 2:
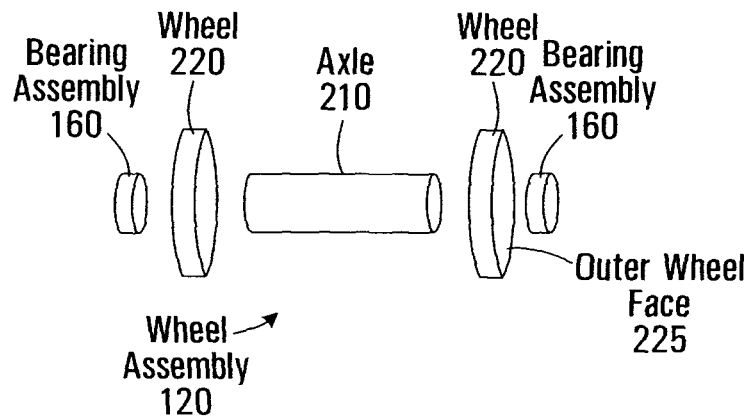
FIG. 2 depicts an exploded view of a wheel assembly, according to an embodiment of the present invention.

FIG. 2 depicts an exploded view of the wheel assembly 120 that shows various wheel assembly components of the wheel assembly 120. In this example, the wheel assembly components comprise an axle 210 joining a pair of wheels 220. The wheel assembly components may further comprise apparatus to join the axle 210 to the wheels 220, as is known to one of skill in the art. The wheel assembly components further comprise apparatus for supporting a vehicle frame (not shown) of a vehicle. Non-limiting examples of a vehicle include a railway vehicle, a truck, a trailer, a bus, an automobile, etc. In this example, the apparatus for supporting a vehicle frame comprises the pair of bearing assemblies 160 coupled to an outer face 225 (only one depicted) of each wheel 220. Each bearing assembly 160 comprises a plurality of sub-components for coupling the vehicle frame to the wheel 220, and includes moving parts configured to allow the wheel to rotate with respect to the frame. Other mechanisms for coupling a vehicle frame to the wheel assembly component will occur to those of skill in the art. The wheel assembly may further include a braking apparatus, various other bearing assemblies, shock absorbers, tires (on road-based vehicles), and other mechanisms known to one of skill in the art.

Figure 3:
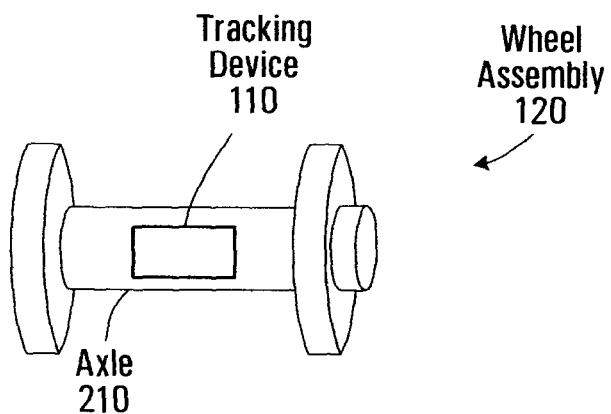
FIG. 3 depicts a system for tracking a wheel assembly component, according to an alternative embodiment of the present invention.
Figure 3:

While FIG. 1 depicts the tracking device 110 configured for attachment to the bearing assembly 160, the tracking device 110 may be configured for attachment to another wheel assembly component. For example, FIG. 3 depicts a system for tracking a wheel assembly component, according to an alternative embodiment of the present invention. The system depicted in FIG. 3 is substantially similar to the system depicted in FIG. 1, with like components represented by like numbers. In this embodiment, the tracking device 110 is configured for attachment to the axle 210, and the tracking device reader 110 is located adjacent to an expected location of the axle 210. In yet other embodiments, the tracking device 110 may be configured for attachment to another component of the wheel assembly 120. Non-limiting embodiments for attachment of the tracking device 110 to a component of the wheel assembly 120 are described below.

The tracking device 110 is generally configured to track the wheel assembly component to which it is attached. However, in an alternative embodiment, the tracking device 110 may be configured to track the wheel assembly 120 as a whole, with the data stored in the tracking device 110 associated with the wheel assembly as a whole. In yet other embodiments, the system may be configured to track a plurality of wheel assembly components that make up the wheel assembly 120, with the data stored in the tracking device 110 associated with the plurality of wheel assembly components. In these embodiments, a subset of wheel assembly components may travel together and share similar maintenance schedules.

In yet another embodiment, the system depicted in FIG. 1 or 3 may further comprise a plurality of tracking devices 110, each attached to a different wheel assembly component. In one non-limiting example, the system depicted in FIG. 1 may comprise two tracking devices 110, one attached to each of the pair of bearing assemblies 160. In these embodiments, the tracking device reader 130, may be configured to read the data stored on the plurality of tracking devices 110. In an alternative embodiment, there may be a plurality of tracking device readers 130, each located at a position where the tracking device 110 may be available for contactless reading of data stored in the tracking device 110, for example adjacent to an expected location of each wheel assembly component, each tracking device reader 130 being configured to read data stored at each tracking device 130, in a one-to-one relationship. Alternatively, there may be fewer tracking device readers 130 than tracking devices 110, and each tracking device reader 130 may be configured to read data stored on two or more tracking devices 110.

In one non-limiting example, there may a tracking device 110 attached to each of the pair of bearing assemblies 160, and a tracking device 110 attached to each wheel 220. Further, there may be a pair of tracking device readers 130 located on either side of an expected location of the wheel assembly 120, one tracking device reader 130 configured to read all tracking devices 110 located on a first side of the wheel assembly 120, and the other tracking device reader 130 configured to read all tracking devices 110 located on the second side of the wheel assembly 120.

Data that may be stored in the tracking device 110 may include any data associated with the wheel assembly component to which it is attached, the wheel assembly 120 of which is part the wheel assembly component, or a plurality of wheel assembly components part of the wheel assembly 120. Examples of data that may be stored include, but are not limited to: an identification number of at least one wheel assembly component and/or the wheel assembly 120, the configuration of at least one wheel assembly component and/or the wheel assembly 120, the history of at least one wheel assembly component and/or the wheel assembly 120, a warranty number of at least one wheel assembly component and/or the wheel assembly 120, the manufacturing date of at least one wheel assembly component and/or the wheel assembly 120, a refurbishment date of at least one wheel assembly component and/or the wheel assembly 120, or any combination thereof.

Figure 4:
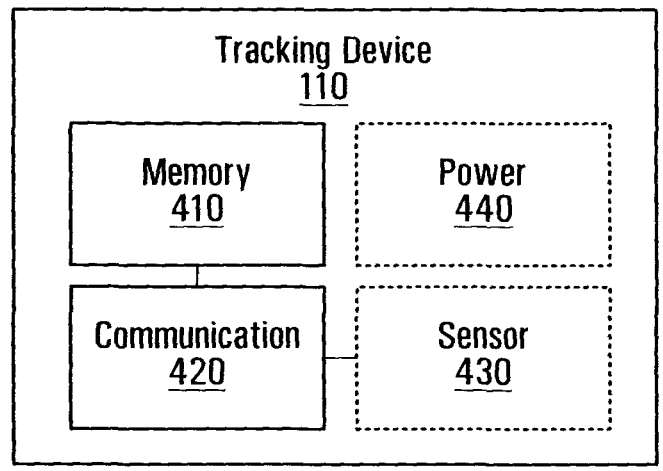
FIG. 4 depicts a block diagram of a tracking device, according to an embodiment of the present invention.

In some embodiments, the tracking device 110 may comprise an electronic tracking device. FIG. 4 depicts a block diagram of an embodiment of the tracking device 110, configured to electronically store and communicate data associated with a wheel assembly component. Such a device may include a memory portion 410, configured to store the data associated with the wheel assembly component, and a communication portion 420, configured to communicate with the tracking device reader 130. In some embodiments, the memory 410 is a read-only static memory, and the data stored in the memory 410 may be stored in the memory 410 at the time of manufacture, or via another one-time write only process. In this embodiment, the communication portion 420 may be configured to transmit the data stored in the memory 410. However, in other embodiments, the memory 410 may be a dynamic memory, and data stored in the memory 410 may be updated. In this embodiment, the communication portion 420 may be configured to both transmit the data, and receive data to be stored in the memory 410. Hence, in this embodiment, the communication portion 420 may be configured to communicate with both the tracking device reader 130, and a tracking device writer (not depicted). In some embodiments, the tracking device reader 130 and the tracking device writer may be separate devices. In other embodiments, as described below, the tracking device reader 130 may further comprise a tracking device writer.

In some embodiments, the tracking device 110 may be a passive tracking device. In such embodiments, and again with reference to FIG. 1, the tracking device reader 130 may be configured to transmit a request 132 to the tracking device 110. In response, the data stored in the tracking device 110 is transferred from the tracking device 110 to the at least one tracking device reader 130, via a data transmission 134.

In these embodiments, the tracking device 110 may comprise a passive radio frequency identification (RFID) device, known to one of skill in the art. Also, the communication portion 420 comprises an antenna, the antenna being configured to both receive data for storage in the memory 410, and further configured to transmit data which is stored in the memory. In this embodiment, the request 132 comprises an RF signal transmitted by the tracking device reader 130. In these embodiments, the tracking device reader 130 comprises an RFID reader. As known by those of skill in the art, passive RFID devices are powered inductively by the RF signal received from the RFID reader. Hence, the request 132 is received by the antenna, and is used by the passive RFID device to provide power for retrieving the data from the memory 410, and the data transmission 134.

In other embodiments, the tracking device 110 may be a semi-passive tracking device. Semi-passive tracking devices are similar to passive tracking devices as described above, however semi-passive tracking devices may include a power source (e.g. a battery) to power the data transmission 134. In one non-limiting example, the tracking device 110 may comprise a semi-passive RFID device, known to one of skill in the art. Semi-passive RFID devices are substantially similar to passive RFID devices, however semi-passive RFID device may include a battery to power the data transmission 134.

In other embodiments, the tracking device 110 may comprise an active tracking device. In these embodiments, the tracking device 110 may also comprise a power source 440, such as a battery, to power the memory 410 and the communication portion 420. Alternatively, the power source 440 may comprise an electrical connection to an on-board vehicle power source. Hence, while in some embodiments the data transmission 134 may occur in response to receiving the request 132, in alternative embodiments, the data transmission 134 may occur in the absence of a request 132. In one embodiment, the data transmission 134 may occur on a periodic basis. Alternatively, the tracking device 110 may further comprise a proximity detector configured to detect the presence of the tracking device reader 130. The proximity detector is further configured to generate a trigger when the at least one tracking device reader 130 is detected. The trigger may be received by the communication portion 420 which, in response, triggers the data transmission 134.

In these embodiments, the tracking device 110 may comprise an active radio frequency identification (RFID) device, known to one of skill in the art, which functions in substantially the same manner as passive RFID devices described above. However, the power source 440 may generally comprise a battery used to power the active RFID device, including the data transmission 134. In this manner, the broadcast range of the active RFID device may be increased, relative to the passive RFID device.

In other embodiments, the tracking device 110 may comprise a semi-active tracking device. Semi-active tracking devices are similar to active tracking devices as described above, however semi-active tracking devices may not turn on until triggered by an external or an internal sensor (see below).

In an alternative embodiment of active electronic tracking device, the tracking device 110 may further comprise a sensor 430 for actively sensing data associated with the environment of the wheel assembly component of the wheel assembly 120, and for transmitting the sensed data or a processed version of the sensed data to the memory 410 for storage. The power source 440 is further configured to power the sensor 430 in these embodiments. In some embodiments, the tracking device 110 may also comprise a clock or timer (not depicted), such that the time that the data was collected by the sensor 430 may also be transmitted to the memory 410 for storage. In alternative embodiments, the tracking device 110 may be coupled to and/or in communication with an external sensor (not depicted) mounted on the wheel assembly component, or another component of the wheel assembly 120, the external sensor being configured to collect data associated with the environment of the area where the external sensor is mounted, and being further configured to transmit the data to the tracking device 110 for storage in memory 410. In embodiments where the tracking device 110 comprises a semi-active tracking device and the semi-active tracking device includes the sensor 430, or the semi-active tracking device is in communication with an external sensor, the semi-active tracking device may be turned on by an event occurring at the sensor 430 or the external sensor, described below.

The sensed data stored in memory 410 may be transmitted to the tracking device reader 130 along with the identifier of the tracking device 110, simultaneously or independently. In the case that the tracking device is an RFID device, the sensed data can be transmitted to the tracking device reader 130 in an RFID response signal after receiving an RFID read signal from the reader 130. The sensed data can then be linked to the specific wheel assembly 120 by associating the sensed data to the identifier of the tracking device 110 associated with the wheel assembly 120. This association can be done by the reader 130 or the computing entity 140. As described below, the reader 130 or the computing entity 140 can then determine if maintenance of the wheel assembly 120 should be effected based at least in part upon the sensed data linked to the wheel assembly 120.

Figure 12:
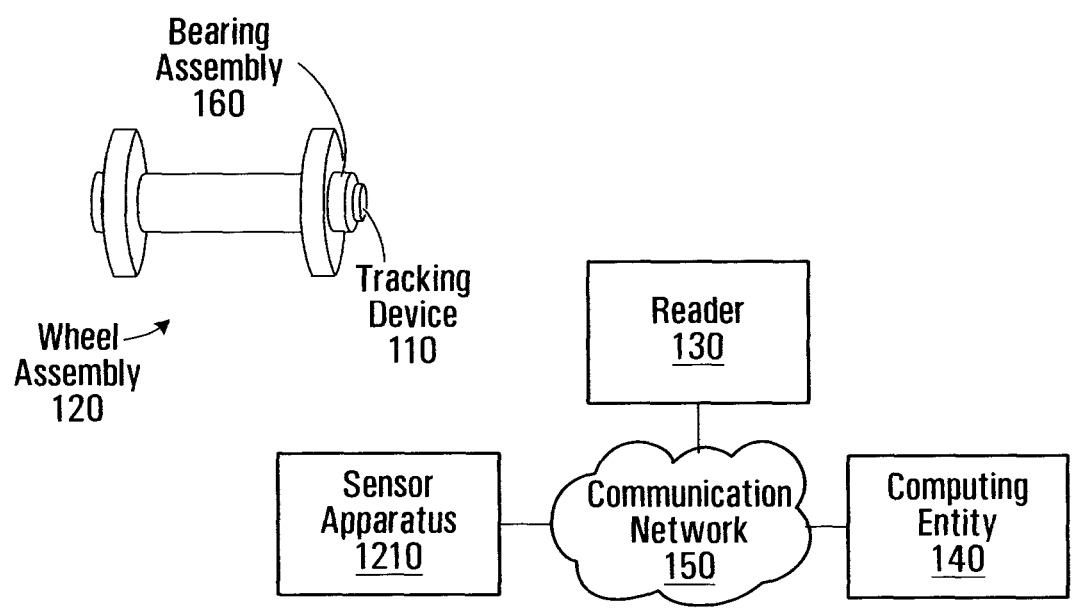
FIG. 12 depicts a system for tracking a wheel assembly component, according to an embodiment of the present invention.

In another non-limiting embodiment for sensing data associated with the environment of the wheel assembly component of the wheel assembly 120, as depicted in FIG. 12, an external sensor apparatus 1210 may be located adjacent to an expected location of the wheel assembly component, generally in the vicinity of the tracking device reader 130. The system depicted in FIG. 12 is substantially similar to the system depicted in FIG. 1, with like components represented by like numbers. The sensor apparatus 1210 is configured for contactless measurement of data associated with the environment of the wheel assembly component. The sensor apparatus 1210 is further configured to transmit the sensed data to the computing entity 140 via the communication network 150. In an alternative embodiment, the sensor apparatus 1210 is in communication with the tracking device reader 130 which, in these embodiments, is configured to receive the sensed data from the sensor apparatus 1210 and process the sensed data and/or transmit the sensed data to the computing entity 140 for processing.

In these embodiments, the sensor apparatus 1210 may be configured for wireless communication with the tracking device reader 130. In yet other non-limiting embodiments, the tracking device reader 130 is configured to receive the sensed data from the sensor apparatus 1210 and transmit the sensed data to the tracking device 110, for storage in the memory 410 of the tracking device, as described below with reference to FIG. 5. In these embodiments, the sensed data may be later retrieved from the tracking device 110 by the tracking device reader 130, or by another tracking device reader.

In some of these embodiments, the sensor apparatus 1210 is in communication with the tracking device reader 130 via the communication network 150, however in other embodiments the sensor apparatus 1210 may be in direct wired or wireless communication with the tracking device reader 130. In one non-limiting example, the sensor apparatus 1210 comprises an infrared temperature sensing apparatus configured to sense the temperature of the bearing assembly 160. The temperature of the bearing assembly is measured by the sensor apparatus 1210 and transmitted to the computing entity 140. In general, the measurement of the temperature of the bearing assembly 160 will be associated with the tracking device reader 130 simultaneously (or within a predetermined period of time) reading the data from the tracking device 110 attached to the bearing assembly. In some non-limiting embodiments, the computing entity 140 is configured to associate the sensed data with the data received from the tracking device reader 130 by the time which the measured temperature and the data from the tracking device reader 130 arrive at the computing entity 140. In other non-limiting embodiments, the sensor apparatus 1210 may further store an identifier associated with the location of the reader 130, and the identifier associated with the location of the reader 130 is further transmitted to the computing entity 140 with the sensed data. In these embodiments, the computing entity 140 is configured to associate the sensed data with the data received from the tracking device reader 130 using the identifier associated with the location of the reader 130 and an identifier received from the reader 130, described below. Further, as described below, the computing entity 140 can then determine if maintenance of the bearing assembly 160 should be effected based at least in part upon the sensed data linked to the bearing assembly 160. It should be understood that the above association and determination on maintenance could be performed by other entities, such as the tracking device reader 130.

Returning now to FIG. 4, in a non-limiting example, the at least one sensor 430 may comprise at least one of a temperature sensor, vibration sensor, a shock sensor, a gyroscopic sensor, a pressure sensor, a torque sensor, or a tamper sensor. In some embodiments, the memory 410 may be configured to store data collected at the sensor 430 on a periodic basis or upon a trigger. This data can comprise a sensed event such as a temperature event, a vibration event, a shock event, a gyroscopic event, a pressure event, a torque event or a tamper event, each of which are described below. For example, in the embodiment where the sensor 430 comprises a temperature sensor, the memory 410 may be configured to store a temperature event at the tracking device 110 periodically or upon a trigger. However, in other embodiments, the memory 410 may be configured to store data collected at the sensor 430 only upon the occurrence of the value of the event meeting a pre-defined criteria, such as exceeding a predetermined threshold.

For example, in the embodiment where the sensor 430 comprises a temperature sensor, the memory 410 may be configured to store a temperature event at the tracking device 110 periodically or upon a trigger. The temperature event, in some embodiments, is the temperature measured by the sensor 430, an indication of a maximum temperature measured by the sensor 430, an indication of a minimum temperature measured by the sensor 430 and/or an indication that the temperature measured by the sensor 430 exceeded a predetermined threshold temperature (either above a maximum or below a minimum). In other embodiments, the temperature event may comprise an indication of a number of occurrences in which the temperature measured by the sensor 430 exceeded a predetermined threshold temperature and/or an indication of a length of time that the temperature measured by the sensor 430 exceeded a predetermined threshold temperature. The computing entity 140 or another entity may then receive the sensed data, which in this case is the data associated with the temperature event(s), from the memory 410 as described above and, based on the sensed data, determine whether the component which is associated with the temperature event requires maintenance to be effected; in some non-limiting embodiments, by comparing the sensed data to an acceptable temperature event limit and determining if the sensed data exceeds the acceptable temperature event limit. For example, in embodiments where the tracking device 110 is attached to a bearing assembly 160 on a wheel assembly 120 that is mounted on a railcar, if the temperature of the bearing assembly 160 rises above a set threshold temperature, this may indicate an unacceptable level of friction in the bearing assembly 160, and that the bearing assembly 160 is due for maintenance.

In another example, in the embodiment where the sensor 430 comprises a vibration sensor, the memory 410 may be configured to store a vibration event at the tracking device 110 periodically or upon a trigger. The vibration event, in some embodiments, is the vibration measured by the sensor 430, an indication of a maximum vibration measured by the sensor 430, an indication that the vibration measured by the sensor 430 exceeded a predetermined threshold vibration an indication of a number of occurrences of the vibration measured by the sensor 430 exceeded a predetermined threshold vibration or an indication of a length of time that the vibration measured by the sensor 430 exceeded a predetermined threshold vibration. The computing entity 140 or another entity may then receive the sensed data, which in this case is the data associated with the vibration event(s), from the memory 410 as described above and, based on the sensed data, determine whether the component which is associated with the vibration event requires maintenance to be effected; in some non-limiting embodiments, by comparing the sensed data to an acceptable vibration event limit and determining if the sensed data exceeds the acceptable vibration event limit. For instance, in the example of FIG. 1, the vibration level of the wheel assembly 120 rising above a threshold may indicate that the wheel assembly component to which the tracking device 110 is attached has undergone stress and may be due for a maintenance procedure.

In another example, in the embodiment where the sensor 430 comprises a shock sensor, the memory 410 may be configured to store a shock event at the tracking device 110. In one embodiment, the shock event comprises an indication of a sudden change in acceleration of the tracking device 110 as sensed by the sensor 430. The computing entity 140 or another entity may then receive the sensed data, which in this case is the data associated with the shock event(s), from the memory 410 as described above and, based on the sensed data, determine whether the component which is associated with the shock event requires maintenance to be effected. For instance, in the example of FIG. 1, a shock event recorded at the tracking device 110 may indicate that the wheel assembly component to which it is attached has undergone stress and may be due for a maintenance procedure.

In another example, in the embodiment where the sensor 430 comprises a gyroscopic sensor, the memory 410 may be configured to store changes in the orientation of the tracking device 110. The gyroscopic event, in some embodiments, is an indication that a change in orientation has occurred as sensed by the sensor 430, an indication of a number of occurrences of a change in orientation sensed by the sensor 430 or an indication of a length of time that the orientation had changed as sensed by the sensor 430. The computing entity 140 or another entity may then receive the sensed data, which in this case is the data associated with the gyroscopic event(s), from the memory 410 as described above and, based on the sensed data, determine whether the component which is associated with the gyroscopic event requires maintenance to be effected; in some non-limiting embodiments, by comparing the sensed data to an acceptable gyroscopic event limit and determining if the sensed data exceeds the acceptable gyroscopic event limit. For instance, in the example of FIG. 1, a change in the orientation detected by the sensor 430 may indicate a change in the upright position of the tracking device 110, and may indicate that the wheel assembly component to which it is attached has also changed its upright position, as may be the case in train derailment, for example. Changes in the orientation of the tracking device 110 may hence indicate that the wheel assembly component to which it is attached has undergone stress and may be due for a maintenance procedure.

In another example, in the embodiment where the sensor 430 comprises a pressure sensor, the memory 410 may be configured to store a pressure event at the tracking device 110 periodically or upon a trigger. The pressure event, in some embodiments, is the pressure measured by the sensor 430, an indication of a maximum pressure measured by the sensor 430, an indication of a minimum pressure measured by the sensor 430 and/or an indication that the pressure measured by the sensor 430 exceeded a predetermined threshold pressure (either above a maximum or below a minimum). In other embodiments, the pressure event may comprise an indication of a number of occurrences in which the pressure measured by the sensor 430 exceeded a predetermined threshold pressure and/or an indication of a length of time that the pressure measured by the sensor 430 exceeded a predetermined threshold pressure. The computing entity 140 or another entity may then receive the sensed data, which in this case is the data associated with the pressure event(s), from the memory 410 as described above and, based on the sensed data, determine whether the component which is associated with the pressure event requires maintenance to be effected; in some non-limiting embodiments, by comparing the sensed data to an acceptable pressure event limit and determining if the sensed data exceeds the acceptable pressure event limit. For example, in the case that the sensor 430 is associated with a wheel assembly component, changes in pressure can be an indicator of maintenance requirements, for example a hydraulic braking mechanism. Losses in pressure, or very high pressures, may indicate a problem with the braking mechanism, and hence that the braking mechanism may be due for a maintenance procedure.

In another example, in the embodiment where the sensor 430 comprises a torque sensor, the memory 410 may be configured to store a torque event at the tracking device 110 periodically or upon a trigger. The torque event, in some embodiments, is the torque measured by the sensor 430, an indication of a maximum torque measured by the sensor 430, an indication of a minimum torque measured by the sensor 430 and/or an indication that the torque measured by the sensor 430 exceeded a predetermined threshold torque (either above a maximum or below a minimum). In other embodiments, the torque event may comprise an indication of a number of occurrences in which the torque measured by the sensor 430 exceeded a predetermined threshold torque and/or an indication of a length of time that the torque measured by the sensor 430 exceeded a predetermined threshold torque. The computing entity 140 or another entity may then receive the sensed data, which in this case is the data associated with the torque event(s), from the memory 410 as described above and, based on the sensed data, determine whether the component which is associated with the torque event requires maintenance to be effected; in some non-limiting embodiments, by comparing the sensed data to an acceptable torque event limit and determining if the sensed data exceeds the acceptable torque event limit. For example, in the case of a wheel assembly component, changes in torque can be an indicator of maintenance requirements, for example for a wheel or an axle. Unexplained changes in torque may indicate a problem with the wheel assembly component, and hence that the wheel assembly component may be due for a maintenance procedure.

In another example, in the embodiment where the sensor 430 comprises a tamper sensor, the memory 410 may be configured to store a tamper event at the tracking device 110. The tamper event, in some embodiments, is an indication that the tracking device 110 and/or the wheel assembly 120 to which it is attached has been tampered with as sensed by the sensor 430 and/or an indication of a number of occurrences that the tracking device 110 and/or the wheel assembly 120 to which it is attached has been tampered with as sensed by the sensor 430. The computing entity 140 or another entity may then receive the sensed data, which in this case is the data associated with the tamper event(s), from the memory 410 as described above and, based on the sensed data, determine whether the component which is associated with the tamper event requires maintenance to be effected. For example, tampering with the tracking device 110, or the wheel assembly component to which it is attached, may indicate that the wheel assembly component may be due for a maintenance procedure.

Other embodiments of sensors and potential sensed data may occur to those of skill in the art and are within the scope of the present invention.

While the communication portion 420 has been described above with reference to RFID device, in another non-limiting example, the communication portion 420 may comprise a Bluetooth wireless communication device. A Bluetooth wireless communication device comprises a wireless communication device which communicates with other Bluetooth wireless communication devices, according to a Bluetooth standard. One non-limiting example of a Bluetooth standard comprises Bluetooth 2.0, as defined by the Bluetooth Special Interest Group (SIG) at www.bluetooth.org. In these embodiments, the tracking device reader 130 may also comprise a Bluetooth wireless communication device.

In another non-limiting example, the communication portion 420 may comprise a Zigbee wireless communication device. A Zigbee wireless communication device comprises a wireless communication device which communicates with other Zigbee wireless communication devices, according to a Zigbee standard. One non-limiting example of a Zigbee standard comprises Zigbee 1.1, as defined by the Zigbee Alliance at www.zigbee.org. In these embodiments, the tracking device reader 130 may also comprise a Zigbee wireless communication device.

Returning now to FIG. 1, in other non-limiting embodiments, the tracking device 110 may comprise an optical tracking device configured to optically store data associated with a wheel assembly component. In some embodiments, the tracking device 110 may comprise an optical representation of data associated with the wheel assembly component to which it is attached. In one non-limiting example, the optical representation may comprise at least one colour uniquely associated with the wheel assembly component. In other embodiments the tracking device 110 may comprise a graphical representation of data associated with the wheel assembly component to which it is attached. In these embodiments, the optical tracking device 110 may comprise a barcode, known to one of skill in the art. In these embodiments, the barcode may be configured for reading by the tracking device reader 130 when the wheel assembly 120 is stationary. In other embodiments, the barcode may be configured for reading by the tracking device reader 130 while the wheel assembly 120 is in motion. In one embodiment, the barcode is configured to be attached to a rotatable wheel assembly component of the wheel assembly 120, and further configured to be read by the tracking device reader 130, when the wheel assembly component, and hence the tracking device 110, is rotating. In one non-limiting example, the barcode is a universal product code, though other barcode formats are within the scope of these embodiments of the present invention.

A further example of an optical tracking device 110 is an alpha-numeric code. In one embodiment, the alpha-numeric code comprises an identification number for the wheel assembly component to which the tracking device 110 is attached.

Embodiments of the tracking device reader 130 for reading data from optical embodiments of the tracking device 1110 are discussed below.

Figure 5:
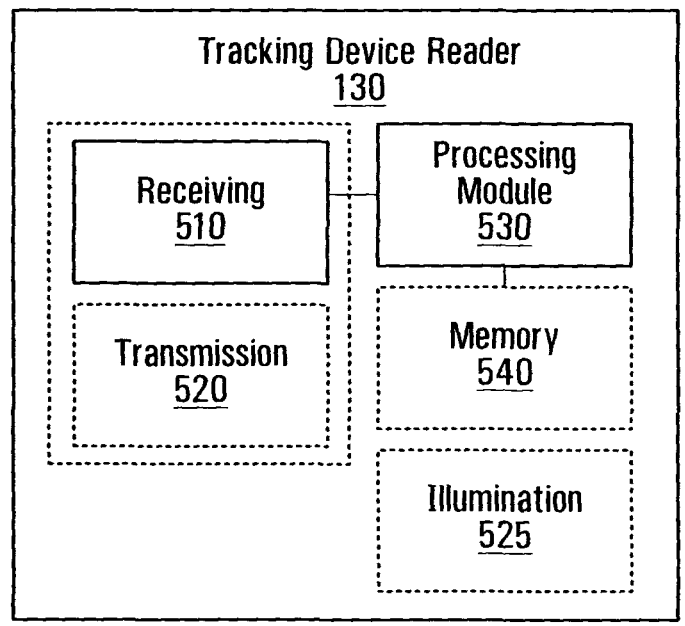
FIG. 5 depicts a block diagram of a tracking device reader, according to an embodiment of the present invention.

FIG. 5 depicts a non-limiting embodiment of the tracking device reader 130. The tracking device reader 130 is configured to receive data from the tracking device 110, and is further configured to transmit the received data to the computing entity 140. In general the technology used in the tracking device reader 130 will be complementary to the technology used in the tracking device 110. For example, if the tracking device 110 comprises an electronic tracking device, then the tracking device reader 130 comprises an electronic tracking device reader. In the non-limiting example discussed above, if the tracking device 110 comprises an RFID device, the tracking device reader 130 comprises an RFID device reader. In another non-limiting example, if the tracking device 110 comprises a Bluetooth device, the tracking device reader 130 comprises a Bluetooth device reader. However, in another example, if the tracking device 110 comprises an optical tracking device 110, then the tracking device reader 130 comprises an optical tracking device reader 130. In a non-limiting example where the tracking device 110 comprises a barcode, the tracking device reader 130 comprises a barcode reader. In another non-limiting example, if the tracking device 110 comprises an alpha-numeric code, the tracking device reader 130 comprises an alpha-numeric code reader.

The tracking device reader 130 may include a receiving apparatus 510 for receiving data from the tracking device 110, for example via the data transmission 134. In embodiments where the tracking device 110 comprises an electronic tracking device, the receiving apparatus 510 is configured to receive the data transmission 134. In one non-limiting example, if the data transmission 134 comprises an RF signal, than the receiving apparatus 510 may comprise an antenna. In embodiments where the tracking device 110 comprises an optical tracking device 110, the receiving apparatus 510 is configured to optically receive the data transmission 134. In one non-limiting example, the data transmission 134 may comprise an optical image of a graphical representation of data associated with the wheel assembly component. Hence, the receiving apparatus 510 comprises apparatus for receiving the optical image. In one non-limiting embodiment, the receiving apparatus 510 may comprise a camera. In another non-limiting embodiment, the receiving apparatus 510 may comprise a diode array. In these embodiments, the tracking device reader 130 may require a clear line of sight to the tracking device 110, in order to read the tracking device 110. Other embodiments of apparatus for reading an optical image may occur to those of skill in the art and are within the scope of the present invention.

In some embodiments, the tracking device reader 130 may further comprise a transmission apparatus 520 for transmitting the request 132 to the tracking device 110. In embodiments where the device 110 is expecting a request 132 prior to initiating the data transmission 134, the transmission apparatus 520 is configured to initiate the information transmission by electronically transmitting the request 132. However, in embodiments where the tracking device 110 is actively transmitting the data transmission 134, the transmission apparatus 520 may be optional.

In some embodiments, where the tracking device 110 comprises an electronic tracking device, the transmission apparatus 520 is configured to electronically transmit the request 132. In one non-limiting example, if the request 132 comprises an RF signal, than the transmission apparatus 520 may comprise an antenna. In these embodiments, the receiving apparatus 510 and the transmission apparatus 520 may share an antenna, as indicated in FIG. 5 by the dotted lines surrounding the two elements. In embodiments where the tracking device 110 is a passive RFID device, the transmission apparatus 520 is configured to transmit the energy for the data transmission 134.

In some embodiments where the tracking device 110 comprises an electronic tracking device, the tracking device reader 130 may be located so as to read the tracking device 110 when the tracking device 110 enters a zone where the request 132 is transmitted, and may thus be received by the tracking device 110. In some embodiments, the location of the tracking device reader 130 may be adjacent to an expected location of the tracking device.

In embodiments where the tracking device 110 comprises an optical tracking device, the tracking device reader 130 may rely on ambient light to read the graphical representation of the data. However, in other embodiments, the tracking device reader 130 may further comprise an illumination apparatus 525 to optically enhance the graphical representation of the data. Non-limiting examples of an illumination apparatus 525 include a light source, such as a light bulb, at least one light-emitting diode (LED) or a laser. In some embodiments, the illumination apparatus 525 may be always on. In other embodiments, the illumination apparatus 525 may be configured to turn on in response to an optional proximity detector (described below) detecting the proximity of a wheel assembly component.

In embodiments where the tracking device 110 comprises a barcode and the tracking device reader 130 comprises a barcode reader, and the illumination apparatus 525 comprises a laser, the illumination apparatus 525 may further comprise apparatus to scan the laser over the barcode, as known to one of skill in the art.

In some embodiments, the transmission apparatus 520 may be further configured to receive a trigger from a user, such that upon receipt of the trigger, the request 132 is transmitted to the tracking device 110. In a non-limiting example, the tracking device reader 130 may be a portable tracking device reader configured to receive a data transmission 134 only when triggered by a user. In one non-limiting example, the user may trigger the request 132 after placing the tracking device reader 130 in the proximity of the tracking device 110.

In other embodiments, the transmission apparatus 520 may be configured to transmit the request 132 periodically. In these embodiments, the periodicity of the transmission of the request 132 is configured so that the tracking device 110 will receive at least one of the requests 132. In particular, in embodiments where the tracking device reader 130 is in a location where the tracking device 110 to be read will be attached to a wheel assembly component which is in motion, for example on a moving railway car, the periodicity of the request 132 must be often enough that the tracking device 110 will receive at least one of the requests 132.

In some embodiments, the transmission apparatus 520 may be further configured to transmit data to the tracking device 110, the transmitted data to be stored in the memory 410 of the tracking device 110. In other embodiments, the transmission apparatus 520 may be further configured to transmit commands to the tracking device 110.

In other embodiments, the tracking device reader 130 may further comprise a presence detector (not depicted) for detecting the presence of the tracking device 110 and/or the wheel assembly component to which it is attached, and/or a wheel assembly, and/or a vehicle which the wheel assembly may be supporting. In these embodiments, the request 132 may be initiated only when a presence is detected. Alternatively, periodic transmission of the request 132 may be initiated when presence is detected. The periodic transmission of the request 132 may occur for a defined period of time. Alternatively, the periodic transmission of the request 132 may cease when presence is no longer detected.

In general, the at least one tracking device reader 130 is located adjacent to an expected location of the wheel assembly component to which the tracking device 110 is attached. Non-limiting examples of such expected locations include, but are not limited to, an inventory control area, a maintenance shed, a factory, a railroad track, or a highway. Further, the tracking device reader 130 is configured at the expected location such that the tracking device reader 130 is able to read the data stored at the tracking device 110. For example, in embodiments where the receiving apparatus 510 and/or the transmission apparatus 520 each comprise an antenna, the configuration of the receiving antenna may be optimized so that the data transmission 134 is transmitted towards the receiving antenna, and the configuration of the transmitting antenna may be optimized so that the request 132 is transmitted towards the expected location of the tracking device 110. In embodiments where the receiving apparatus 510 comprises a camera, the line of sight of camera to the expected location of an optical tracking device may be optimized.

In some embodiments, the transmission apparatus 520 and the receiving apparatus 510 may be further configured with respect to each other, and with respect to an expected direction of travel of the wheel assembly component. In a non-limiting example, the transmission apparatus 520 may be located at a first location. The receiving apparatus 510 may be located at a second location further down the expected direction of travel from the first location. The tracking device 110 attached to a wheel assembly component moving in the expected direction of travel thus encounters the transmission apparatus 520 prior to encountering the receiving apparatus 510. Hence, the tracking device 110 receives the request 132 from the transmission apparatus 520 at the first location, and transmits the data transmission 134 to the receiving apparatus 510 when the tracking device 110 reaches the second location. In embodiments that comprise the sensor apparatus 1210 of FIG. 12 in communication with the tracking device reader 130, the sensor apparatus 1210 may be located at the first location, and the tracking device 110 may be configured to transmit measured data received from the sensor apparatus 1210 to the tracking device 110 for storage, at the second location.

In some embodiments, the tracking device reader 130 may further comprise a memory module 540 configured to store data associated with the at least one tracking device reader 130. In one non-limiting example, data stored in the memory module 540 may comprise at least one of a location of the tracking device reader 130 and an identification number of the tracking device reader 130. Other examples of data stored in the memory module 540 may occur to a person of skill in the art and are within the scope of the present invention. The memory module 540 may be further configured to store data received from the tracking device 110 via the data transmission 134.

The tracking device reader 130 further comprises a processing module 530. The processing module 530 may be configured to consolidate data received from the tracking device 110, data stored in the memory module 540, and data received from an optional data input device 145 of FIG. 1 (discussed below). Alternatively, the processing module 530 may be configured to process data received from the tracking device 110. In a non-limiting example, the processing module 530 may be configured to process the format of the data contained in the data transmission 134. The processing module 530 may be further configured to effect a handshaking process between the tracking device 110 and the tracking device reader 130. In one non-limiting example, where the tracking device 110 and the tracking device reader 130 comprise RFID devices, the processing module 530 may be further configured to effect a RFID handshaking process between the two devices. The processing module 530 may be further configured to transmit data to the computing entity 140 via the communication network 150. In embodiments where the tracking device 110 comprises an optical tracking device, the processing module 530 may be configured to processes optical images of the tracking device 110, to extract the data contained within them.

In some embodiments, the system depicted in FIG. 1 further comprises a plurality of tracking device readers 130, each located at a different expected location of the wheel assembly component. In some embodiments, the location of at least one tracking device reader 130 is fixed. However, in other embodiments, at least one tracking device reader 130 may be a portable device, intended to be brought to the expected location of the wheel assembly component by a user. In yet other embodiments, there may be a plurality of tracking device readers 130, some with fixed locations, and others which are portable.

In some embodiments, the system depicted in FIG. 1 may further comprise an optional data input device 145, configured to receive from a user data associated with the wheel assembly component. The data input device 145 is further configured to transmit the data to the tracking device reader 130. However, in other embodiments, the data input device 145 may be in communication with the computing entity 140 via the communication network 150, and may be configured to transmit the data to the computing entity 140. Data which may be entered into the data input device 145 by a user may comprise notes on the history of the wheel assembly component, including but not limited to the assembly and/or maintenance of the wheel assembly component, and/or the commissioning of the wheel assembly component and/or the configuration of the wheel assembly component.

Figure 6:
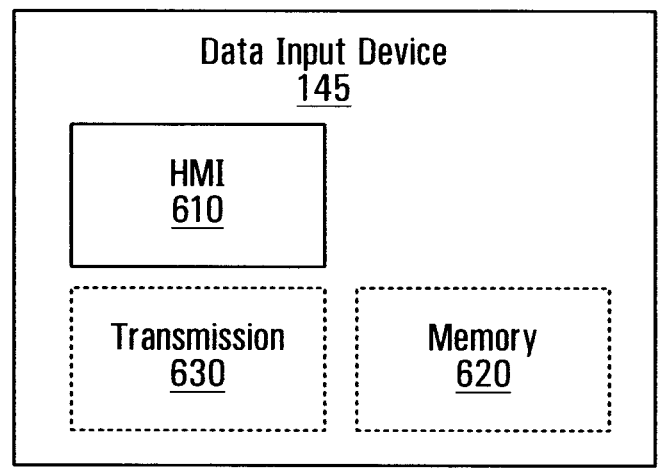
FIG. 6 depicts a block diagram of a data input device, according to an embodiment of the present invention.

As illustrated in FIG. 6, in some embodiments, the data input device 145 may comprise a human-machine interface (HMI) 610 configured to allow a user to input the data to the data input device. In some embodiments, the HMI 510 may comprise a keyboard and a display device for allowing a user to view the input data, for example via a graphical user interface (GUI). In other embodiments, the HMI 510 may comprise a display device configured with a GUI, and a touch-screen apparatus.

The data input device 145 may further comprise a memory module 620 for storing the data received from a user prior to transmission of the data. The data input device may further comprise a transmission apparatus 630 for transmitting data received from the user to another component of the system depicted in FIG. 1.

Figure 7:
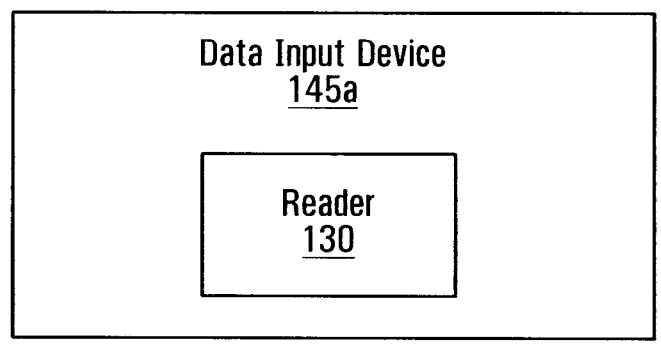
FIG. 7 depicts a data input device, according to an alternative embodiment of the present invention.

In some embodiments, the data input device 145 may be a portable device. In other embodiments, the data input device 145 and the tracking device reader 130 may be combined into a data input device 145a, as depicted in FIG. 7. In one non-limiting example, the data input device 145a may incorporate all the functionality of the portable tracking device reader 130 embodiment described previously, along with the user data input functionality of the data input device 145.

Figure 8:
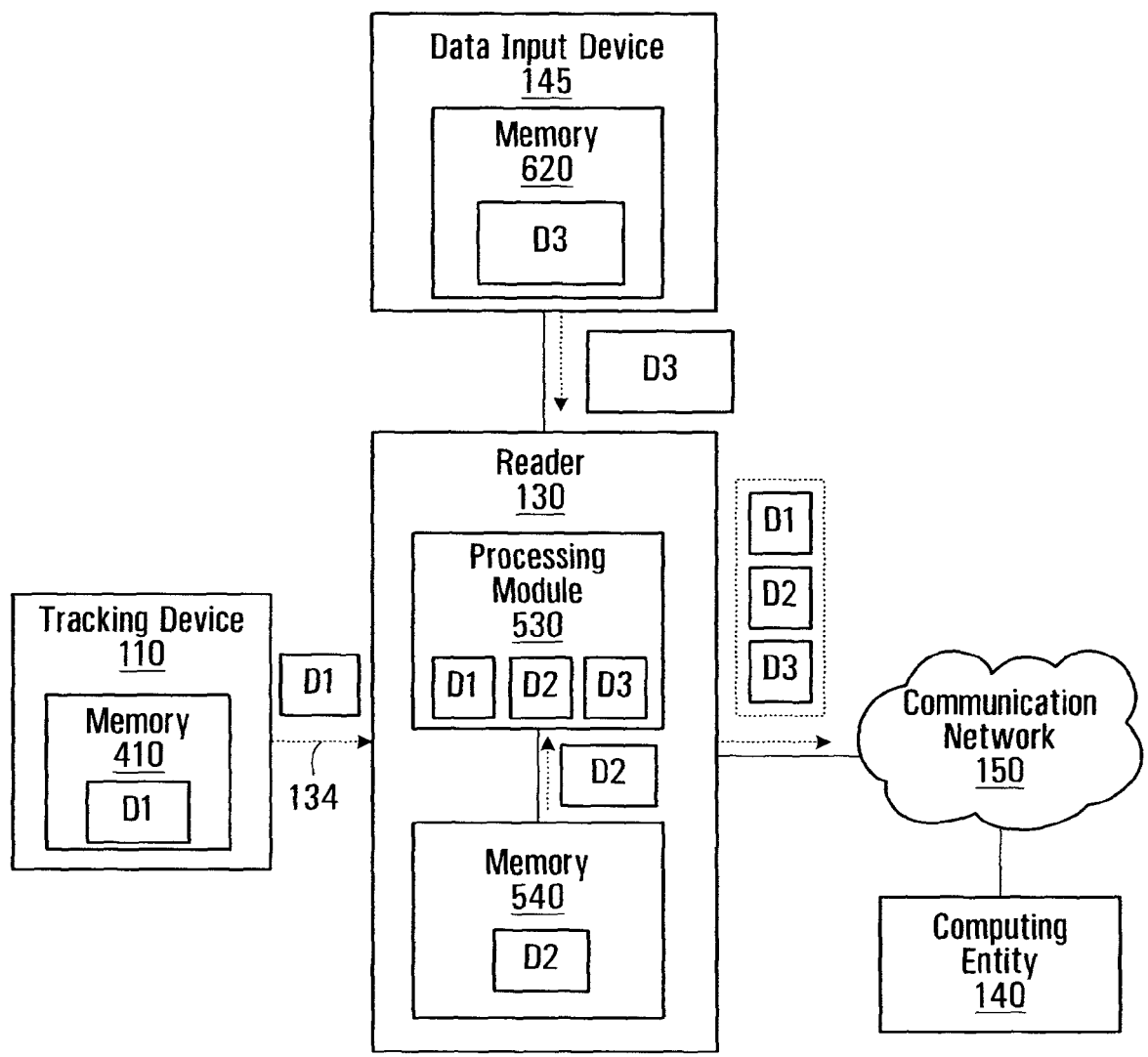
FIG. 8 depicts a system for tracking a wheel assembly component, according to an embodiment of the present invention.

FIG. 8 depicts a non-limiting example of how data may be collected with the system depicted in FIG. 1 and consolidated for transmission to the computing entity 140. In this example, data D1 comprises a first set of data, associated with a wheel assembly component, and stored in the memory portion 410 of the tracking device 110 attached to the wheel assembly component. In one non-limiting embodiment, data D1 may comprise an identifier of the wheel assembly component to which the tracking device is attached. In embodiments where the tracking device 110 comprises a sensor 430, the data D1 may further comprise sensed data. Data D2 comprises a second set of data, associated with a tracking device reader 130, and which may be further associated with the wheel assembly component, and stored in the memory module 540 of the tracking device reader 130. In one non-limiting embodiment data D2 may comprise an identifier of the tracking device reader 130. In one non-limiting example, the identifier of the tracking device reader 130 may comprise an internet protocol (IP) address. Data D3 comprises a third set of data, associated with a wheel assembly component, and entered by a user into the optional data input device 145. Data D3 is stored in the memory module 620 of the data input device 145. In one non-limiting embodiment, data D3 may comprise text entered into the data input device 145 by a user, the text further describing the history of the tracking device 110. For example, in embodiments where the wheel assembly component comprises the bearing assembly 160, the tracking device 110 attached to the bearing assembly 160 having recently undergone a maintenance procedure, a user may enter the text "Bearings Machined" into the data input device 145.

In this non-limiting example, the tracking device reader 130 receives data D1 from the tracking device 110 via the data transmission 134, in the manner described previously. Optionally, around the same time as the data transmission 134 occurs, a user of the data input device 145 may enter data D3 into the data input device 145, to enhance or clarify the data D1. The processing module 530 of the tracking device reader 130 receives data D1 and data D3, and may retrieve data D2 from the memory module 540 of the tracking device reader 130. The processing module 530 may then process data D1, D2, and/or D3 for transmission to the computing entity 140. The processing may comprise formatting the data D1, D2, and/or D3 into a format preferred by the computing entity 140. The processing may also comprise compressing data D1, D2, and/or D3 for transmission to the computing entity 140. In some embodiments, data D1, D2 and/or D3 may be transmitted sequentially to the computing entity 140. However, in other embodiments D1, D2, and/or D3 may be consolidated into a single data set for transmission to the computing entity 140. In embodiments that comprise a sensor apparatus 1210 in communication with the tracking device reader 130, the tracking device reader 130 may be further configured to receive sensed data from the sensor apparatus 1210, and further configured to process the sensed data in a manner similar to data D1, D2 and/or D3.

Figure 9:
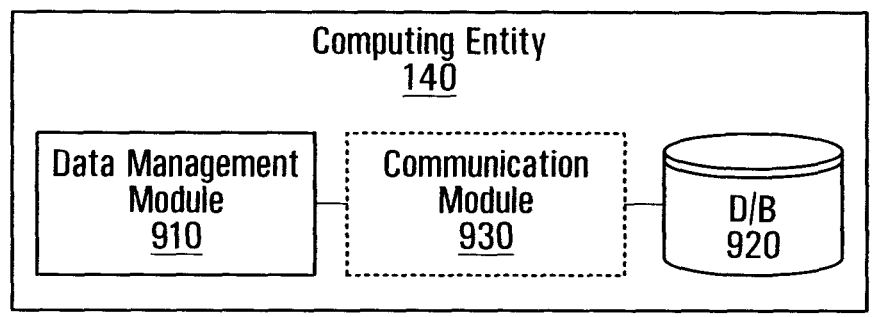
FIG. 9 depicts a block diagram of a computing entity, according to an embodiment of the present invention.

FIG. 9 depicts a non-limiting embodiment of the computing entity 140, configured for receiving data associated with the wheel assembly component from the tracking device reader 130, and further configured for tracking the history of the wheel assembly component. The computing entity 140 comprises a data management module 910, for managing the data received from the tracking device reader 130. The computing entity further comprises a database 920 for storing the data received from the tracking device reader 130. In some embodiments, the computing entity may also comprise a communication module 930 for communicating with an inventory management system. In some embodiments, the components of the computing entity 140 may be co-located and may comprise, for example, a server or a personal computer. In other embodiments, the components of the computing entity may be distributed across several geographic locations, and in communication via the communication network 150, or another communication network.

The data management module 910 is configured to receive the data transmitted from the tracking device reader 130, and is further configured to transmit the data to the database 920. The data management module 910 may be further configured to filter the data. In some embodiments, the data received from the tracking device reader 130 may comprise redundant data. For example, in some embodiments, the tracking device reader 130 may read the data from a tracking device 110 multiple times. In these embodiments, the data management module 910 may be configured to delete the redundant data. The data management module 910 may be further configured to aggregate data received from the tracking device reader 130. For example, returning to FIG. 8, in embodiments where D1, D2 and/or D3 are transmitted sequentially, the data management module 910 may be configured to consolidate D1, D2 and/or D3. Further, in embodiments where the tracking device 130 transmits data received from a plurality of tracking devices 110, the data management module 910 may be configured to aggregate the data from the plurality of tracking devices 110 prior to transmitting the data to the database 920. The data management module 910 may also be configured to format the data received from the tracking device reader 130 for storage in the database 920. For example, the database 920 may expect to receive the data parsed in a certain format which is different from the format in which it is received at the data management module 910. Hence, the data management module 910 may be configured to parse the data for storage in the database 920. In embodiments where the tracking device 110 comprises a passive or an active RFID device, the data management module may comprise RFID middleware, as known to one of skill in the art.

In some embodiments, the data management module 910 may further include a timing device and may be configured to add the date and/or time that the data was received to the data, prior to transmitting the data to the database 920.

Figure 10:
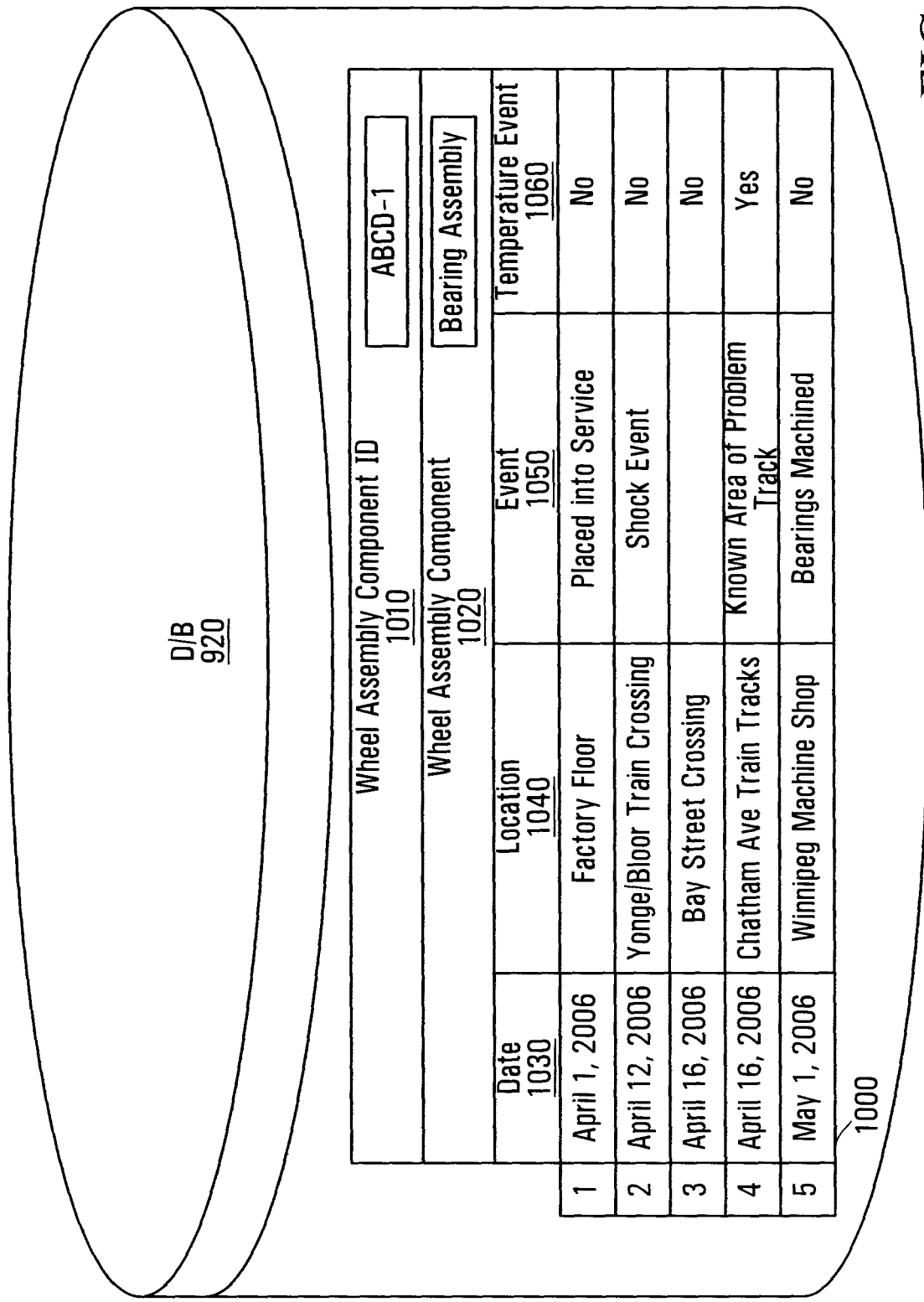
FIG. 10 depicts a table of a database, according to an embodiment of the present invention.

As depicted in FIG. 10, database 920 may comprise at least one table 1000 corresponding to at least one wheel assembly component. The table 1000 may comprise a field 1010 wherein the wheel assembly component identification (ID) number is recorded. In the example depicted in FIG. 10, the wheel assembly component ID is recorded as ABCD-1. Alternatively, the table 1000 may comprise a field 1020 wherein the type of wheel assembly component which corresponds to the wheel assembly component having the ID of field 1010 is recorded. In FIG. 10, the wheel assembly component with ID number ABCD-1 is recorded as a "bearing assembly". The fields 1010 and/or 1020 may be recorded in table 1000 during a provisioning process. Alternatively the fields 1010 and/or 1020 may be recorded in table 1000 at the first instance that the database 920 encounters the ID number in data received from the data management module 910.

Table 1000 further comprises columns 1030, 1040 and 1050 which may be populated by data received from the data management module 910. Each row in the table 1000 comprises the data from a read event, a read event comprising the receipt of a data transmission 132 from a tracking device 110, at the tracking device reader 130, with redundant read event filtered by the data management module 910. Hence, the plurality of rows in the table comprises a history of the wheel assembly component having the ID number recorded in field 1010. In one non-limiting embodiment, the column 1030 comprises the date of the read event. The date recorded in the column 1030 may comprise a date received from the tracking device reader 130, for example in embodiments where the tracking device reader 130 comprises a timing device. Alternatively, the date recorded in the column 1030 may comprise a date and/or time added to the data at the data management module 910, for example a date and/or time that the data was received at the data management module 910. In yet another alternative embodiment, the date and/or time may comprise a date and/or time added to the data by the database 920, for example a date and/or time that the data was received at the database 920. In these embodiments, the database 920 further comprises a timing device.

The column 1040 may comprise the geographic location of the tracking device reader 130, where the read event occurred. The geographic location recorded at column 1040 may be added to the data received at the tracking device reader 130, for example in embodiments where the location of the tracking device reader 130 is stored in the memory module 540. Alternatively, the geographic location recorded at column 1040 may be added to the data received by the tracking device reader 130 from data received from the optional data input device 145, for example in embodiments where the user input of the data input device 145 comprises a location of the tracking device reader 130. Alternatively, the location of the tracking device reader 130 may be stored in the memory module 620 of the data input device 145, and added to the user input prior to the transmission of data to the to the tracking device reader 130.

In embodiments where the data returned from the tracking device reader 130 does not comprise the geographic location of the tracking device reader 130, but comprises an identification number of the tracking device reader 130, the geographic location of the tracking device reader 130 may be retrieved by the database 920, from another table within database 920, or another database accessible by the computing entity 140.

Figure 11:
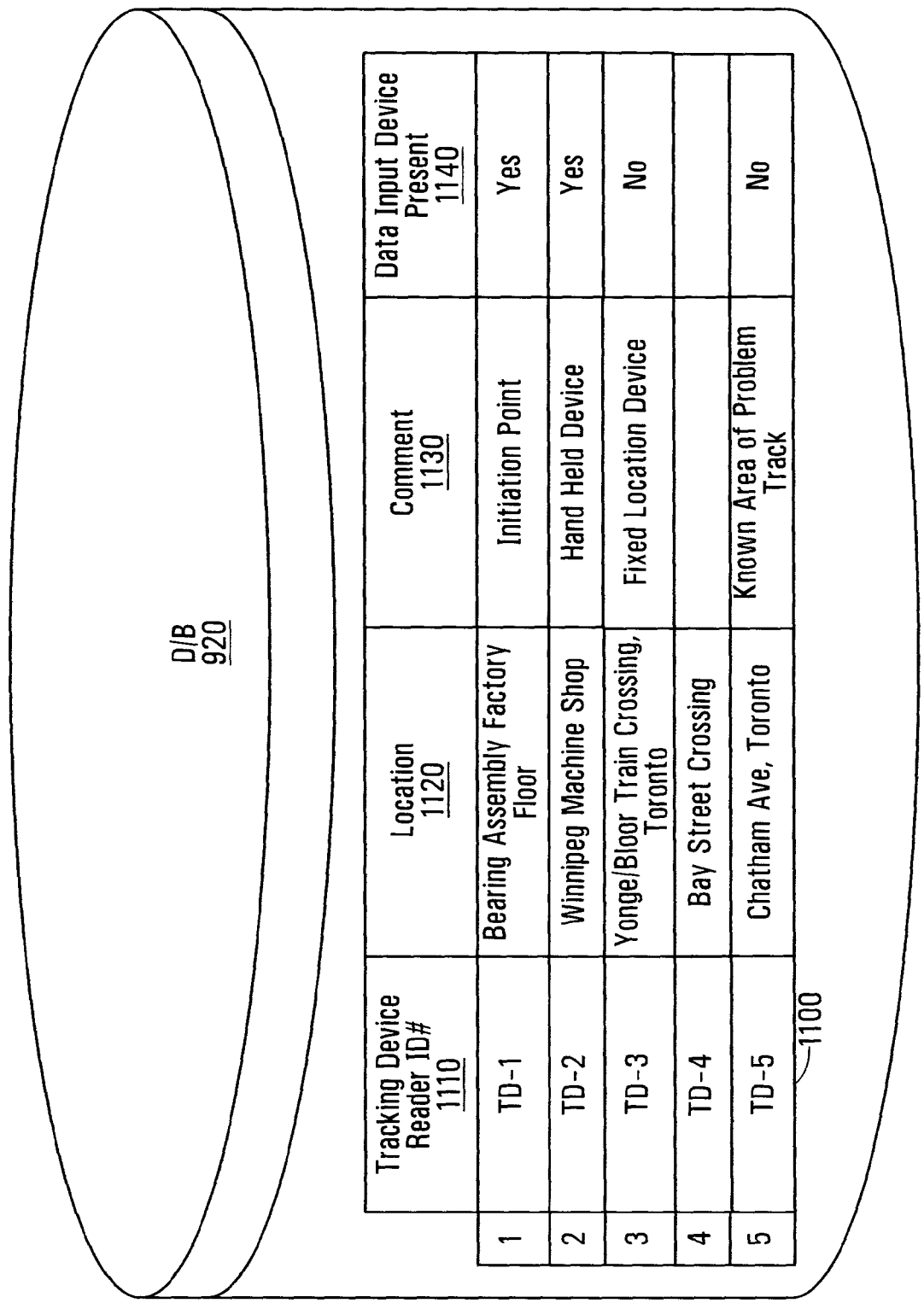
FIG. 11 depicts a table of a database, according to an embodiment of the present invention.

A non-limiting example of a table 1100 comprising the identification number of the tracking device reader 130, recorded along with the geographic location of the tracking device reader 130, is depicted in FIG. 11. Table 1100 comprises at least one row, the at least one row comprising data related to the tracking device reader 130. In embodiments of the systems depicted in FIGS. 1 and 3, which further comprise a plurality of tracking device readers 130, each at a different geographic location, each row in the table 1100 comprises data related to each of the plurality of tracking device readers 130, in a one-to-one relationship.

Table 1100 may comprise a column 1110 comprising the tracking device reader identification (ID) number. In a non-limiting example depicted in FIG. 11, the tracking device reader ID number recorded in the first row comprises TD-1. Table 1100 further comprises a column 1120, comprising the geographic location of the tracking device reader 130. Column 1120 may contain as much data as necessary to uniquely identify the location of the tracking device reader 130. In a non-limiting alternative embodiment the table 1100 may further comprise a column 1130 comprising an optional comment field, for recording additional information associated with the tracking device reader 130. In the non-limiting example depicted in the first row of Table 1100, at column 1120, the location of the tracking device reader 130 with ID number TD-1 is recorded as "Factory Floor", indicating that it is located on the floor of a factory where wheel assembly components are manufactured. At column 1130, the tracking device reader 130 with ID number TD-1 is identified as an "Initiation Point", indicating that it is the first tracking device reader encountered by a tracking device 110 attached to a wheel assembly component after the wheel assembly component is manufactured.

In the non-limiting example depicted in the third row of Table 1100, at column 1120, the location of the tracking device reader 130 with ID number TD-3 is recorded as "Yonge/Bloor Train Crossing, Toronto", indicating that it is located at a train crossing near the intersection of Yonge Street and Bloor Street in Toronto. At column 1130, the tracking device reader 130 with ID number TD-3 is identified as a "Fixed Location Device".

However, in other embodiments, only the location of the tracking device reader 130 may be recorded. In these embodiments, as illustrated in the fourth row of Table 11, a field in the column 1120 may be left blank.

In other embodiments, the column 1130 may also comprise data about the location of the tracking device 130. In the non-limiting example depicted in the fifth row of Table 1100, at column 1120, the location of the tracking device reader 130 with ID number TD-4 is recorded as "Chatham Ave, Toronto", indicating that it is located adjacent to a stretch of railway track near Chatham Avenue in Toronto. At column 1130, the tracking device reader 130 with ID number TD-5 is identified as a "Known Area of Problem Track", indicating that there are known problems with the railway track to which the tracking device reader with ID number TD-5 is adjacent.

In an alternative embodiment the Table 1100 may further comprise column 1140, which comprises an indicator of whether a data input device 1140 is connected to the tracking device reader 130. In the example depicted in FIG. 11, "Yes" indicates the presence of a data input device 1140 and "No" indicates that a data input device 1140 is not present.

The various columns of Table 1100 may be populated in a provisioning step.

Returning to FIG. 10, the column 1050 of Table 1000 may comprise data describing an event associated with the read event. In one embodiment, the user input to the data input device 145 may comprise the data associated with the read event. In another embodiment, the data in column 1040 may comprise data from the sensor 430 of the tracking device 110, or the sensor apparatus 1210. In the example depicted in the second row of FIG. 10, the event is identified as a "Shock Event". In this example, the sensor 430 on tracking device 110 comprises a shock sensor and the data in column 1050 of row 2 is indicative that the shock sensor has sensed a shock event such as a sudden change in acceleration to the tracking device 110.

In yet another embodiment, a given row may have an empty entry in the event column 1050, as illustrated in the third row of Table 1000, indicating that there is no additional data associated with the read event. In some embodiments, this may indicate that the tracking device 110 has simply passed a certain location, as recorded in the corresponding column 1040.

However, in alternative embodiments, the data populating the column 1050 may also be referenced to a field in another Table within the database 920. As illustrated in the fourth row of the Table 1000, the data populating the column 1050 has been populated with data from the column 1130 of Table 1100, and comprises the data associated with the geographic location of the tracking device reader 130 located at the "Chatham Ave Train Tracks". Hence, at column 1050 it is recorded that the tracking device 110 has traversed a "Known Area of Problem Track".

Table 1000 may further comprise a column 1060 which comprises data dedicated to a sensor 430 on the tracking device 110. Alternatively, in embodiments which comprise the sensor apparatus 1210, as depicted in FIG. 12, the column 1060 may further comprise data associated with the sensor apparatus 1210. In a non-limiting example depicted in FIG. 10, the column 1060 comprises data indicating "Temperature Events" associated with the temperature sensor 430 or the temperature sensor device 1210, a temperature event in one non-limiting example comprising a temperature sensor measuring the temperature of the wheel assembly component rising above a predetermined threshold value. In the embodiment depicted in FIG. 10, some of the data of the column 1060 comprise the word "No", indicating the absence of a temperature event, while others comprise the word "Yes", indicating the presence of a temperature event. As discussed previously, in embodiments where the wheel component assembly comprises the bearing assembly 160, the temperature of the bearing assembly 160 rising above a threshold value may indicate that a bearing mechanism in the bearing assembly 160 is worn out and requires machining. Within these embodiments, the number of times that the temperature of the bearing assembly 160 rose above a threshold temperature may also indicate that the bearing mechanism in the bearing assembly 160 is worn out and requires machining. Still within these embodiments, the maximum measured temperature of the bearing assembly 160 may also indicate that the bearing mechanism in the bearing assembly 160 is worn out and requires machining. Each of these measurements could be recorded as temperature events.

Turning now to FIG. 13, database 920 may also comprise a table 1300, for tracking the distance traversed by a wheel assembly component. The table 1300 is substantially similar to the table 1000, with like data fields represented by like numbers. The table 1300 differs from table 1000 in that it includes a column 1310 for recording the cumulative distance traversed by the wheel assembly component. In other embodiments, the distance traveled by the wheel assembly component between tracking device readers 130 may be recorded at the column 1310. In this embodiment, it is understood that a plurality of tracking device readers 130 will be deployed generally adjacent to a plurality of expected locations of a wheel assembly component, and that the distance between each of the plurality of tracking device readers 130 is known, such that the cumulative distance traversed by the wheel assembly component may be tracked.

In some embodiments, the cumulative distance recorded at the column 1310 may be calculated by the data management module 910. In other embodiments, the cumulative distance may be recorded at the tracking device 110, based on data transmitted to the tracking device 110 from the plurality of tracking device readers 130. In these embodiments, the cumulative distance may be calculated by each of the tracking device readers 130 by retrieving the current recorded cumulative distance from the tracking device 110, calculating the cumulative distances based on the current recorded distance and the location of the tracking device reader 130. The cumulative distance may then be transmitted to the computing entity 140 for storage at the database 920, and transmitted to the tracking device 110 for storage. In other embodiments, the total cumulative distance may be stored primarily at the tracking device 110 until it reaches a tracking device reader 130 located at a destination, the tracking device reader 130 located at the destination configured to retrieve the cumulative distance traveled by the tracking device 110.

In alternative embodiments, a location indication of the tracking device 110, and therefore the wheel assembly 120, may be tracked with a location apparatus coupled to the tracking device 110. The location apparatus may be a Global Positioning System (GPS) device or another apparatus used to generate a location indication. The generated location indication can be transmitted along with the identifier when the tracking device 110 communicates with the tracking device reader 130. The location indication can be transmitted together with the identifier or in separate signals. In the case of RFID technology, the reader 130 can transmit an RFID read signal to the tracking device 110 and the tracking device in response can transmit at least one RFID response signal to the reader 130. Subsequently, the tracking device reader 130 may transmit the received location indication to the computing entity 140 and the computing entity 140 may calculate the cumulative distance traveled by the tracking device, similar to the description above. In a non-limiting example, the computing entity 140 can compare the received location indication with a previously saved location indication in order to calculate the distance traveled by the tracking device (and therefore by association the wheel assembly 120).

Returning now to the computing entity 140 depicted in FIG. 9, the data management module 910 may be further configured to determine if a wheel assembly component is due for maintenance. For example, the data management module 910 may be configured to periodically examine the records of database 920 and determine if any of the wheel assembly components having a record in the database are due for maintenance. If a wheel assembly component is due for maintenance, the data management module 920 may be configured to transmit a message to a user of the systems of any of FIGS. 1, 3 and 12, for example via an e-mail, or an alert sent to a user device such as a telephony device. Alternatively, the data management module 910 may instruct the communication module 930 to transmit the message. In yet another embodiment, the data management module 910 may instruct the database 920 to create yet another table of identification numbers of wheel assembly components which are due for maintenance, for later retrieval by a user. In yet another embodiment, the data management module 910 may transmit an indicator to the tracking device reader 130, the indicator comprising the identification number of a wheel assembly component which is due for maintenance. In these embodiments, the tracking device reader 130 may be further configured to transmit a message to a user of the systems of any of FIGS. 1, 3 and 12, as described above, if the identification number of the wheel assembly component is encountered while retrieving data from the tracking device 110.

In another embodiment, the data management module 910 may be configured to consult the records of database 920 when data associated with a wheel assembly component arrives at the data management module 910. The history of the wheel assembly component may be determined at this time. If a wheel assembly component is due for maintenance, the message may be transmitted to a user immediately, or the identification number of the wheel assembly component may be stored in the appropriate table of database 920.

Criteria which may be used by the data management module 910 for determining if a wheel assembly component is due for maintenance include:

- the time period that a wheel assembly component has been in service exceeding a threshold time period;
- the distance that a wheel assembly component has traveled exceeding a threshold distance;
- the occurrence of one or more events as detected by the sensor 430 or the sensor apparatus 1210, as described previously, including but not limited to exceeding a threshold, the number of times a threshold is exceeded, the length of time a threshold is exceeded, or a combination thereof;
- the occurrence of a temperature event as detected by the temperature sensor device 1210.

Other criteria, which may be used for determining if a wheel assembly component is due for maintenance, may occur to one of skill in the art, and are within the scope of the present invention.

In some embodiments, a maintenance indication can be transmitted to the tracking device 110 to be stored within the memory 410. This maintenance indication can indicate that the particular component requires maintenance or does not require maintenance. In these embodiments, the computing entity 140 can transmit the maintenance indication to the tracking device reader 130 and the tracking device reader 130 can transmit the maintenance indication to the tracking device 110. The maintenance indication being stored on the memory 410 effectively distributes the maintenance instructions within the components, rather than a central database. At a subsequent time, a user could access the memory 410, such as through an RFID read if the tracking device 110 is an RFID device, and receive the maintenance indication without requiring a look-up with a database.

Non-limiting embodiments for attachment of the tracking device 110 to a component of the wheel assembly 120 are now considered. In general, many wheel assembly components are rotatable objects, and hence the tracking device 110 is configured for attachment to a rotatable object. Further, to minimize variations in the rotational momentum of the rotatable wheel assembly component while rotating, many wheel assembly components are symmetric about an axis of rotation. Hence, as the wheel assembly components are rotatable objects, the tracking device 110 may be configured to maintain the balanced rotation of the wheel assembly component when the wheel assembly component is rotating.

Figure 14:
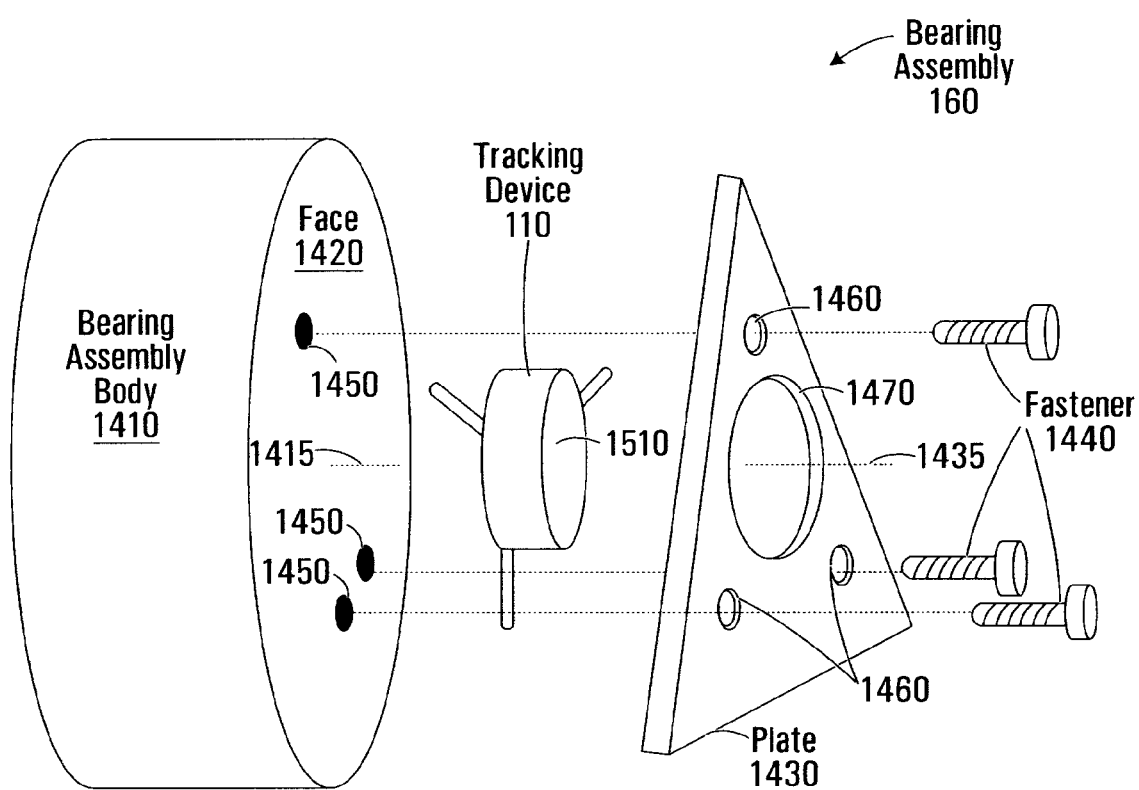
FIG. 14 depicts a perspective of a bearing assembly and a tracking device, according to an embodiment of the present invention.

An exploded view of one example of a wheel assembly component is depicted in FIG. 14, depicting detail of the bearing assembly 160, and further depicting the tracking device 110 in a position of attachment on the bearing assembly 160.

In this non-limiting embodiment, the bearing assembly 160 comprises a bearing assembly body 1410. The bearing assembly body 1410 generally comprises a plurality of components including the vehicle frame portion, the wheel portion and the bearing portion discussed previously. In one non-limiting example, the bearing assembly body 1410 is cylindrical in nature with a cylindrical axis of symmetry 1415, which is aligned with the axis of rotation of the bearing assembly.

The bearing assembly body 1410 further comprises an end configured for attachment to a wheel, such as the wheel 220 discussed above, whereby the axis of symmetry 1415 will be in alignment with the axis of rotation of the wheel, and an opposite end comprising a face 1420. Further, the face 1420 shares the axis of symmetry 1415 of the bearing assembly body 1410.

The bearing assembly 160 further comprises a plate 1430, which is configured for attachment to the face 1420. In the depicted non-limiting embodiment, the plate 1430 exhibits triangular symmetry about a central axis 1435, however in other non-limiting embodiments, the plate 1430 may not be triangular. In yet other non-limiting embodiments, the plate 1430 may not be symmetric. Other shapes of the plate 1430 may occur to one of skill in the art and are within the scope of the present invention.

The plate 1430 is configured for attachment to the face 1420 via a fastening mechanism. In the embodiment depicted in FIG. 14, the fastening mechanism comprises at least one fastener 1440, and at least one receptacle 1450 in the face 1420 for receiving the at least one fastener 1440. The plate 1430 comprises at least one hole 1460 for each fastener 1440/receptable 1450 pair, the at least one hole 1460 arranged in a pattern complementary to the pattern of the at least one receptacle 1450, such that the at least one fastener 1440 may be passed through the at least one hole 1460 and received by the at least one receptacle 1450. In one non-limiting embodiment, the at least one fastener comprises 1440 a bolt, and the at least one receptacle 1450 comprises a threaded bore.

In general, the fastening mechanism will be configured for attaching the plate 1430 to the face 1420 such that the central axis 1435 of the plate 1430 is aligned with the axis of symmetry 1415 of the bearing assembly body 1410. In some embodiments, the plate 1430 further comprises a central opening 1470. In some embodiments, the central opening 1470 is rotationally symmetric about the central axis 1435 of the plate 1430. In some non-limiting embodiments, the central opening 1470 may be circular. In other non-limiting embodiments, the opening 1470 may be triangular or square. However other shapes of the opening 1470 may occur to one of skill in the art and are within the scope of the present invention.

In some embodiments, the at least one fastener 1440 may further serve to lock together bearing assembly components that comprise the bearing assembly body 1410. Hence in embodiments where the at least one fastener 1440 comprises a bolt, the screw or bolt may be attached with a given amount of torque to ensure that the bearing assembly components remain locked together. Within these embodiments, the plate 1430 comprises a locking plate for ensuring that the at least one fastener 1440 maintains the given amount of torque: i.e. the at least one fastener 1440 does not come loose. In this embodiment, the locking plate may comprise a bearing-side surface configured for abutment to the face 1420, and an oppositely located locking surface, comprising a washer mechanism for maintaining the given torque of the bolt when it is in an attached position. In one non-limiting embodiment, the washer mechanism may comprise a raised portion of the plate 1430, compressible by a head of the bolt.

Figure 15A:
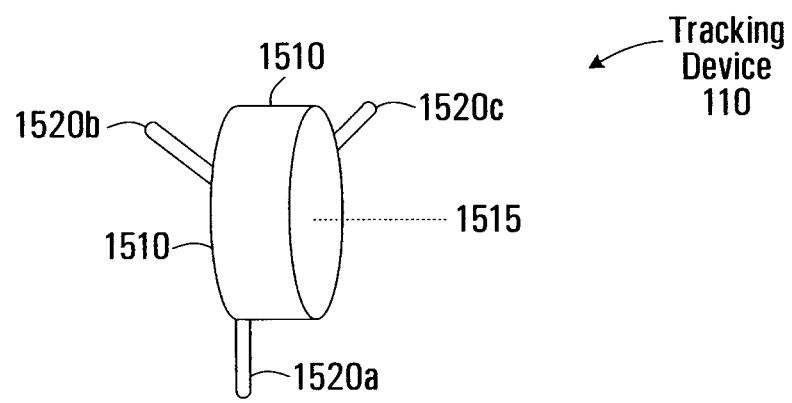
FIGS. 15A to 15D depict various views of a tracking device, according to an embodiment of the present invention.
Figure 15B:
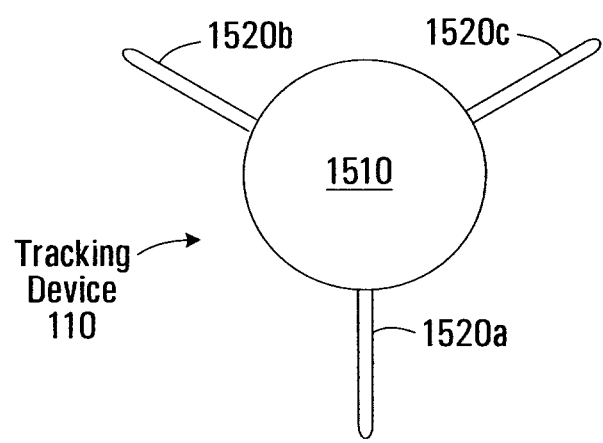
Figure 15C:
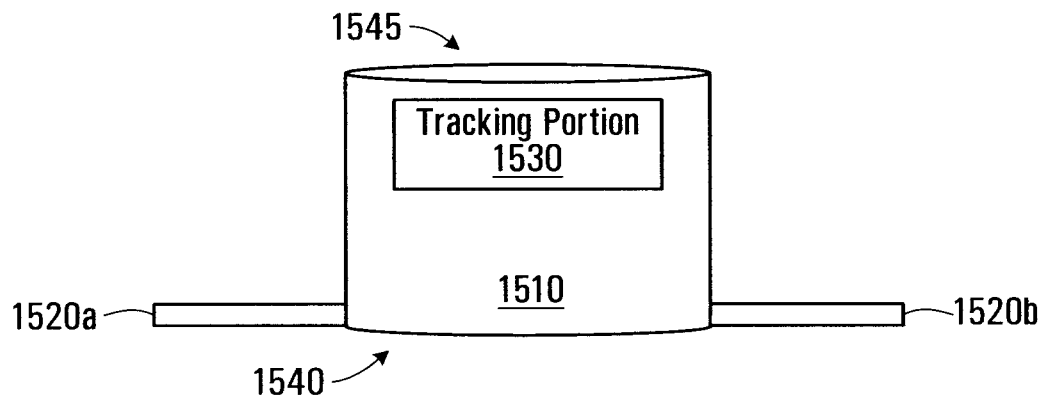

Turning now to an embodiment of the tracking device 110, which is depicted in a position of attachment in FIG. 14, with reference to FIGS. 15A, 15B, and 15C, the tracking device 110 comprises a body 1510 having a central axis 1515, the body 1510 being rotationally symmetric about the central axis 1515. The tracking device 110 further comprises an attachment section connected to the body 1510. In this example, the attachment section comprises at least one attachment member connected to the body. In some embodiments, the attachment member comprises at least two arms, configured symmetrically about the central axis 1515. In the depicted non-limiting embodiment, the at least one attachment member comprises three arms 1520a, 1520b and 1520c, configured symmetrically about the central axis 1515, with an angle of approximately 120° between each arm. However, in other embodiments, the attachment member may comprise a different number of arms, configured symmetrically about the central axis 1515. A symmetrical configuration of the arms may assist with maintaining the balanced rotation of the wheel assembly component when the tracking device 110 is attached to the wheel assembly component, and the wheel assembly component is rotating. However, in some embodiments, a non-symmetrical configuration of the arms may also assist with maintaining the balanced rotation of the wheel assembly component when the tracking device 110 is attached to the wheel assembly component, and the wheel assembly component is rotating. In these embodiments, a counterweight may be present on the body 1510 to compensate for any shift in the centre of mass of the tracking device 110 that may occur due to a non-symmetrical configuration of the arms.

The body 1510 further comprises a tracking portion 1530. In embodiments where the tracking device 110 comprises an electronic tracking device, the tracking portion 1530 comprises the elements depicted in FIG. 4, described previously. Within these embodiments, the tracking portion 1530 may be encased in the body 1510, while in other embodiments the tracking portion 1510 may be located on the body 1510. In embodiments where the tracking device 110 comprises an optical tracking device, the tracking portion 1530 holds the graphical representation of the data associated with a wheel assembly component, described previously. In these embodiments, the tracking portion 1530 may be encased in the body 1510, the body 1510 being optically transparent such that the tracking portion 1530 is readable by the tracking device reader 130, when the tracking device 110 is in a position of attachment to the wheel assembly component. For example, in embodiments where the tracking portion 1530 holds a barcode, and the barcode is encased by the body 1510, the barcode must be optically visible to the tracking device reader 130 through the body 1510. However, in other embodiments, the tracking portion 1530 may be located on the body 1510, at a position where the tracking portion 1530 is visible to the tracking device reader 130 in a position of attachment to the wheel assembly component.

In some embodiments, the body 1510 is elongate and comprises an abutment end 1540 and a distal end 1545. In some embodiments, the at least one attachment member may be flush to the abutment end 1540 and/or connected to the abutment end 1540. However, in other embodiments, the at least one attachment member may be connected to the abutment end 1540, the distal end 1545, or between the distal end 1545 and the abutment end 1540. In these embodiments, the at least one attachment member may be bendable, as discussed below, such that when the tracking device 110 is attached to the wheel assembly component, the at least one attachment member may be clamped between the plate 1430 and the face 1420, as discussed below. In other embodiments the face 1420 may comprise a recessed area, configured to receive the abutment end 1540; hence, the at least one attachment member may be connected to the location on the body 1510 which allows the at least one attachment member to lie across the face 1420 when the body 1510 is inserted into the recessed area.

However, in general, the abutment end 1540 may be configured for abutment to the wheel assembly component, for example to the face 1420 of the bearing assembly 160. In the embodiments depicted in FIGS. 14 and 15A, 15B and 15C, the abutment end 1540 is planar in nature, for abutment against the face 1420.

In some instances, the wheel assembly component may be comprised of materials which may interfere with the contactless reading of the tracking portion 1530, by the tracking device reader 110, when the tracking device 110 is attached to the wheel assembly component. In these embodiments, the tracking portion 1530 may be located closer to the distal end 1545 than the abutment end 1540. For example, in some embodiments, the wheel assembly component is comprised of a metal, which may generally interfere with RF signals received and/or transmitted by some types of electronic tracking devices, such as certain RFID devices. Hence, in these embodiments, locating the tracking portion 1530 closer to the distal end 1545 of the elongated body 1510 displaces the tracking portion 1530 from the abutment end 1540, such that when the abutment end 1540 is in contact with a metallic wheel assembly component, electronic interference is reduced.

Figure 15D:
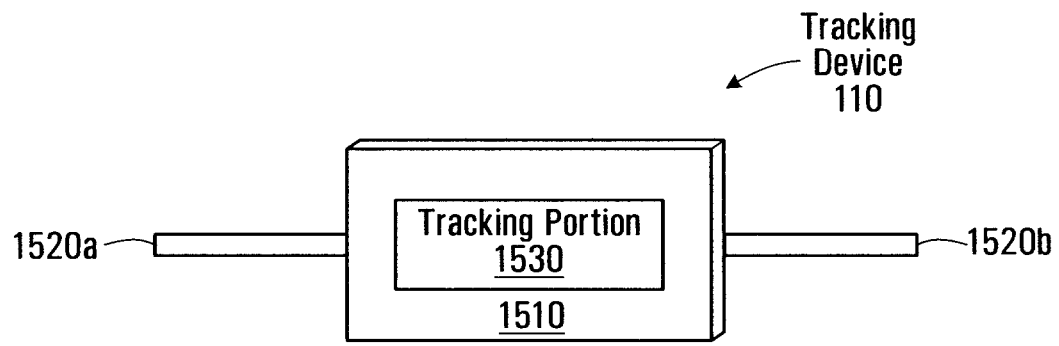

However, in other instances, the wheel assembly component may be comprised of materials which may not interfere with the contactless reading of the tracking portion 1530, by the tracking device reader 110, when the tracking device 110 is attached to the wheel assembly component. In these embodiments, the tracking portion 1530 may be located near the distal end 1545, near the abutment end 1540 or in between. Further, in these embodiments, the body 1510 may not be elongate. FIG. 15D depicts another non-limiting embodiment of the tracking device 110, similar to the tracking device depicted in FIG. 15C, with like components represented by like numbers. In this embodiment, the body 1510 may not be elongate, and the tracking portion 1530 will be located adjacent to the wheel assembly component when the tracking device 110 is attached to the wheel assembly component.

In embodiments where the plate 1430 comprises a central opening 1470, the cross-section of the body 1510 may be configured to be less than the cross section of the central opening 1470. In embodiments where the body 1510 is cylindrical, and the central opening 1470 is circular, the diameter of the body 1510 may be configured to be less than the diameter of the central opening 1470. Hence, in embodiments where the body 1510 is elongate, the body 1510 may be configured to extend through the central opening 1470, when the tracking device 110 is attached to the wheel assembly component. An example of this configuration is depicted in FIG. 14, whereby the cylindrical body 1510 of the tracking device 110 will extend through the central opening 1470 when the plate 1430 is attached to the face 1420.

In some embodiments, the body 1510 may be further comprised of a shell, the shell made of a plastic, including but not limited to polypropylenes, epoxies, and resins. Other types of plastics may include plastics which may be formed into shapes using an overmolded or injection molding process. In other embodiments, the body 1510 may be comprised of a metal. Other materials that may comprise the body will occur to those of skill in the art and are within the scope of the present invention.

Returning now to the at least one attachment member, at least a portion of each of the at least one attachment member is configured for clamped retention between the face 1420 and the plate 1430, with sufficient force to prevent the tracking device 110 from being released when the tracking device 110 is in an attached position, and while the rotatable object to which it is attached is rotating. Within the embodiment depicted in FIGS. 14, 15A, 15B, and 15C, arms 1520a, 1520b and 1520c which comprise the at least one attachment member, are configured to be clamped between the face 1420 and the plate 1430 when the plate 1430 is attached to the face 1420.

Figure 15E:
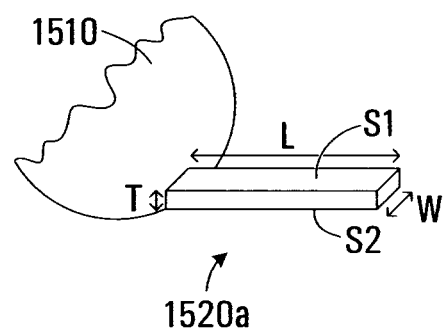
FIG. 15E depicts a perspective view of detail of a tracking device, according to an embodiment of the present invention.

With reference to FIG. 15E, depicting detail of arm 1520a, in general the arms 1520a, 1520b and 1520c will comprise a given length, L, a given width, W, and a given thickness, T, the given thickness T separating a first surface, S1 and a second surface, S2, wherein the first surface S1 and the second surface S2 are substantially parallel. The first surface S1 and the second surface S2 are configured for contact with the plate 1430 and the face 1420 respectively, when the tracking device 110 is in an attached position.

The given length L corresponds to the distance the arms 1520a, 1520b and 1520c extend from the body 1510.

The dimensions L, W and T of each of the arms 1520a, 1520b and 1520c are configured to allow the plate 1430 to be attached to the face 1420, without comprising the given torque of the fastening mechanism, when the tracking device 110 is in an attached position. For example, when the fastening mechanism comprises at least one bolt, at least one hole 1460, and at least one bolt hole in the face 1420, the at least one bolt is generally tightened to the given amount of torque, as discussed above. When the tracking device 110 is in the attached position, the presence of the arms 1520a, 1520b and 1520c between the plate 1430 and the face 1420 should not cause the bolts to loosen.

Furthermore, in this embodiment, when the tracking device 110 is in the attached position, the plate 1430 may not actually be in contact with the face 1420, with the entire clamping force between the plate 1430 and the face 1420 being borne by the first surface and the second surface. Hence first surface S1 and second surface S2 are substantially parallel, and the clamping force is evenly distributed along the first surface and the second surface.

When the tracking device 110 is in the attached position, at least a portion of each of the arms 1520a, 1520b and 1520c may be clamped between the plate 1430 and the face 1420. In some embodiments, each of the arms 1520a, 1520b and 1520c is configured to extend from the body 1510 to a point between an edge of the central opening 1470 of the plate 1430 and an outer edge of the plate 1430, when the tracking device 110 is in the attached position. In other embodiments, each of the arms 1520a, 1520b and 1520c is configured to extend from the body 1510 to an outer edge of the plate 1430, when the tracking device 110 is in the attached position.

In yet other embodiments, each of the arms 1520a, 1520b and 1520c is configured to extend from the body 1510 to beyond the outer edge of the plate 1430, when the tracking device 110 is in the attached position. In some of these embodiments, at least a portion of each of the arms 1520a, 1520b and 1520c configured to extend beyond an outer edge of the plate, may be bendable. In these embodiments, the given thickness T may be substantially less than the given length L. In these embodiments, the bendable portion of each of the arms 1520a, 1520b and 1520c may be used to facilitate the securing of the tracking device 110 to the plate 1430, prior to attaching the plate 1430 to the face 1420. In other words, the tracking device 110 is secured to the plate 1430 as each of the arms 1520a, 1520b and 1520c are wrapped around an edge of the plate 1430. This situation is illustrated in FIGS. 16A, 16B, 17A and 17B, which together depict a method of securing the tracking device 110 to the plate 1430, prior to attaching the plate 1430 to the face 1420.

Figure 16A:
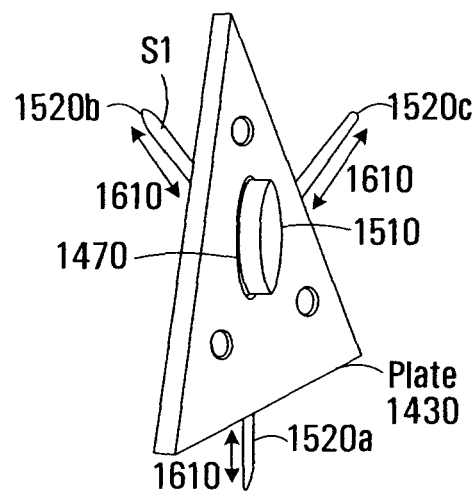
FIG. 16A depicts a perspective view of a bearing assembly and a tracking device, according to an embodiment of the present invention.

FIG. 16A depicts a perspective view of an embodiment of the invention wherein a portion 1610 of the given length L is configured to extend beyond the outer edge of the plate 1430. FIG. 16A further depicts the body 1510 and arms 1520a, 1520b, and 1520c of the tracking device 110, in a position wherein the body 1410 has been inserted through the central opening 1470 of the plate 1430. In this position, the first surface S2 of each of the arms 1520a, 1520b, and 1520c are adjacent to the bearing-side surface of the plate 1430.

Figure 16B:
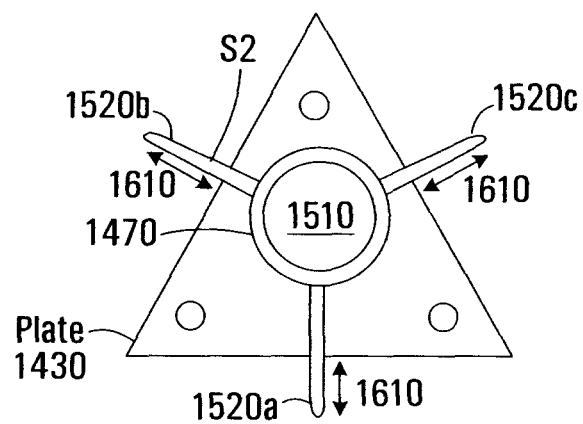
FIG. 16B depicts a side view of a bearing assembly and a tracking device, according to an embodiment of the present invention.

FIG. 16B depicts a side view of the embodiment depicted in FIG. 16A when viewed from the bearing-side surface of the plate 1430. FIG. 16B further depicts the relative position of the surface S2 of the arm 1520b to the bearing-side surface of the plate 1430.

Figure 17A:
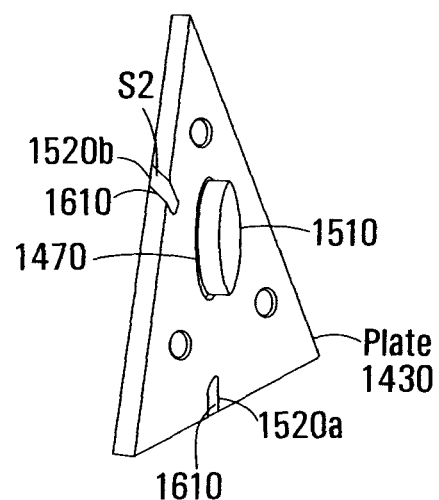
FIG. 17A depicts a perspective view of a tracking device secured to a bearing assembly, according to an embodiment of the present invention.
Figure 17B:
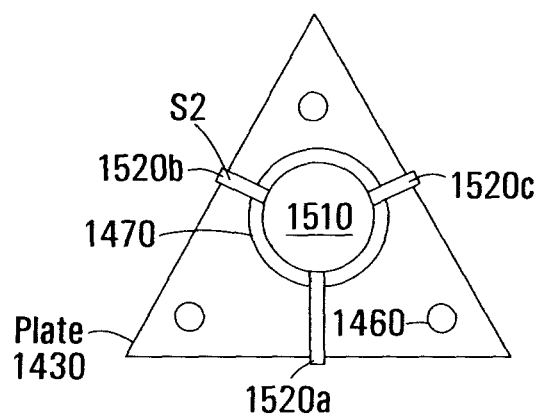
FIG. 17B depicts a side view of a tracking device secured to a bearing assembly, according to an embodiment of the present invention.

FIG. 17A depicts a perspective view of an embodiment of the invention, similar to the embodiment depicted in FIG. 16A, wherein the portion 1610 is bent around an edge of the plate 1430. In this position, the first surface S1 is now in contact with the side opposite the bearing-side surface of the plate 1430, and the second surface S2 faces away from the plate 1430. FIG. 17B depicts a side view of the embodiment depicted in FIG. 17A when viewed from the bearing-side surface of the plate 1430. From this perspective, the portion 1610 is in the bent position and hence not visible.

In the embodiment depicted in FIGS. 17A and 17B, when the portion 1610 is in the bent position, the arms 1520a, 1520b, and 1520c frictionally retain the tracking device 110 to the plate 1430. The plate 1430 may then be attached to the face 1420 without regard for holding the tracking device 110 between the plate 1420 and the face 1430.

Figure 18A:
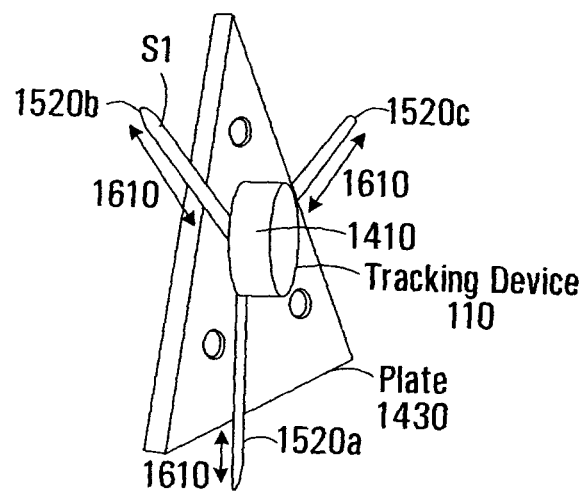
FIG. 18A depicts a perspective view of a bearing assembly and a tracking device, according to an embodiment of the present invention.
Figure 18B:
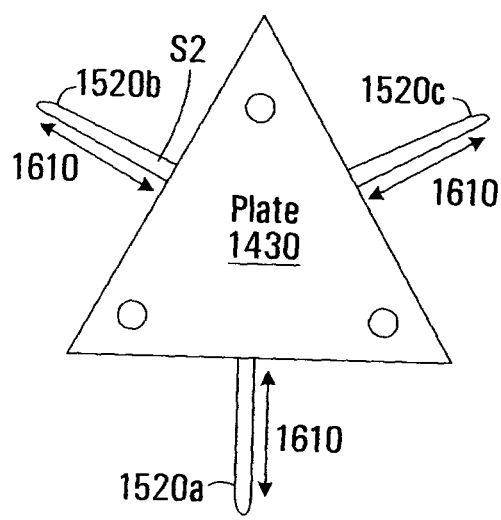
FIG. 18B depicts a side view of a bearing assembly and a tracking device, according to an embodiment of the present invention.

FIG. 18A depicts a perspective view of an alternative embodiment of the plate 1430, wherein the plate 1430 is lacking the central opening 1470. An end of the body 1410 is configured for abutment against the surface of the plate 1430 opposite the bearing side surface, in an attached position. FIG. 18A further depicts the relative position of surface S1 with respect to the plate 1430. FIG. 18B depicts a side view of the embodiment depicted in FIG. 18A when viewed from the bearing-side surface of the plate 1430, and further depicts the relative position of surface S2 with respect to the plate 1430.

Figure 19:
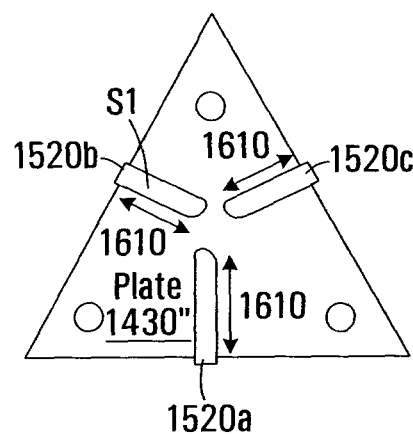
FIG. 19 depicts a side view of a tracking device secured to a bearing assembly, according to an embodiment of the present invention.

FIG. 19 depicts a side view of an embodiment of the invention when viewed from the bearing-side surface of the plate 1430, similar to the embodiment depicted in FIG. 17B, wherein the portion 1610 is bent around an edge of the plate 1430. In this position, the second surface S2 is in contact with the bearing-side surface of the plate 1430, and the first surface S1 faces outwards from the plate 1430. In this embodiment, the portion 1610 of the arms 1520a, 1520b, and 1520c secure the tracking device 110 to the plate 1430. The plate 1430 may then be attached to the face 1420, and the portion 1610 is clamped between the plate 1430 and the face 1420.

Figure 20:
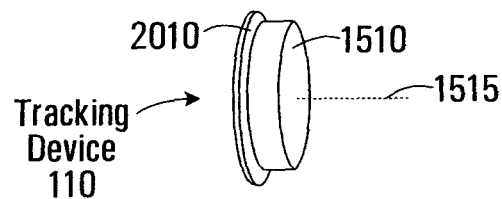
FIG. 20 depicts a perspective view of a tracking device, according to an alternative embodiment of the present invention.

FIG. 20 depicts a perspective view of yet another non-limiting embodiment of the at least one attachment member, comprising a lip 2010 connected to the body 1510. The lip 2010 comprises a rotationally symmetric circumferential lip extending from the body 1510, substantially perpendicular to the central axis 1515. In this embodiment, the lip 2010 is configured for clamped retention between the plate 1430 and the face 1420, when the body 1510 extends through the central opening 1470 of the plate 1430. In yet further embodiments, the lip 2010 may not be completely circumferential and only portions of the depicted lip 2010 may be present.

Figure 21:
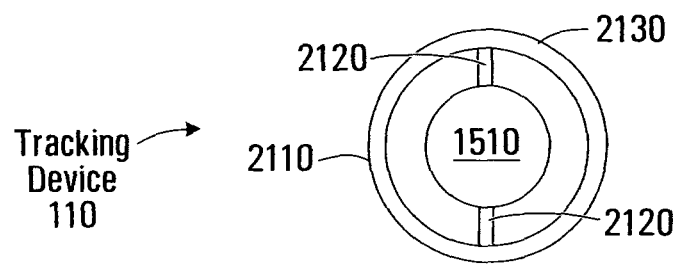
FIG. 21 depicts a side view of a tracking device, according to an alternative embodiment of the present invention.

FIG. 21 depicts a side view of yet another non-limiting embodiment of the attachment member, comprising a web portion 2110 connected to the body 1510, the web portion 2110 configured for clamped retention for clamped retention between the plate 1430 and the face 1420 when the body 1510 extends through the central opening 1470 of the plate 1430. The web portion 2110 comprises at least one arm portion 2120, connected to at least one auxiliary retention member 2130. While the web portion 2110 depicted in FIG. 21 comprises two arm portions 2120 and one auxiliary retention member 2130, other arrangements of arm portions 2120 and auxiliary retention members 2130 will occur to those of skill in the art and are within the scope of the present invention.

Figure 22A:
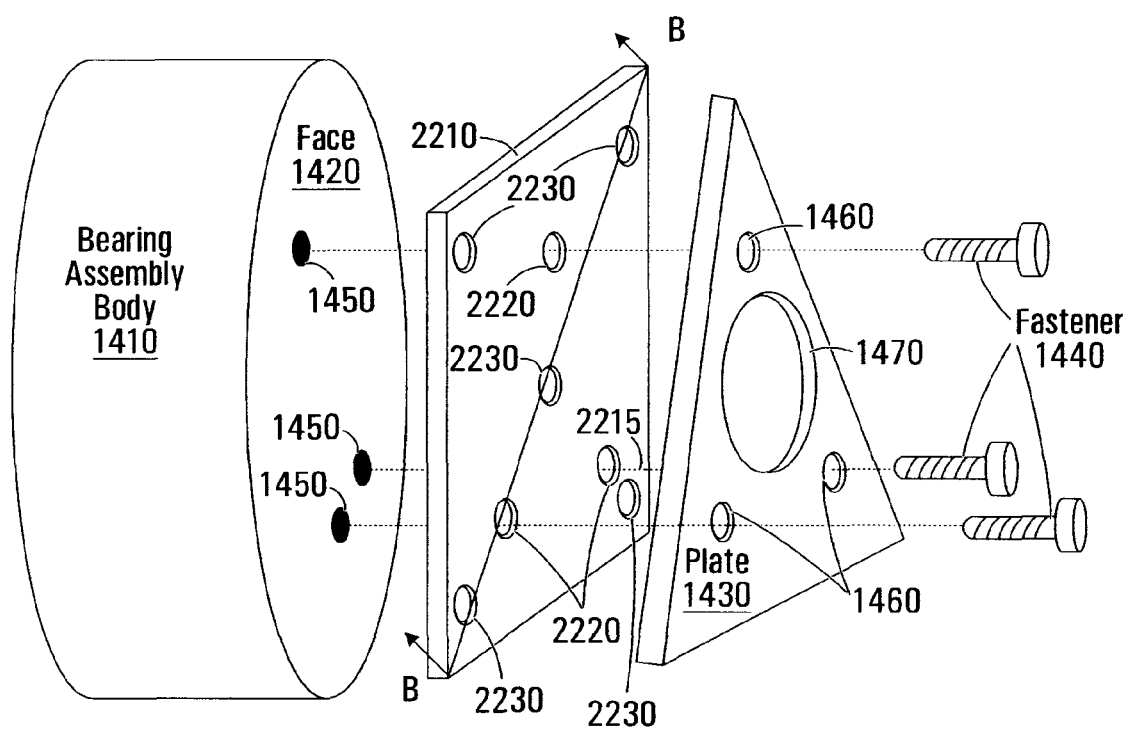
FIG. 22 depicts a perspective view of a bearing assembly and a tracking device attachment portion, according to an embodiment of the present invention.

FIG. 22A depicts a perspective view of yet another non-limiting embodiment of the attachment member. The bearing assembly components depicted in FIG. 22A are similar to the bearing assembly components depicted in FIG. 14, with like components represented by like numbers. In this embodiment, the at least one attachment member comprises a tracking portion attachment plate 2210, configure for clamped retention between the plate 1430 and the face 1420. The tracking portion attachment plate 2210 may be rotationally symmetric about a central axis 2215. The tracking portion attachment plate 2210 further comprises at least one fastener receiving hole 2220, arranged in a pattern complementary to the pattern of the at least one receptacle 1450. Hence, the at least one fastener 1440 may pass through both the at least one hole 1460 in the plate 1430, and the at least one fastener receiving hole 2220 in the tracking portion attachment plate 2210, for fastening the plate 1430 and the tracking portion attachment plate 2210 to the face 1420.

The tracking portion attachment plate 2210 further comprises at least one tracking portion fastener receptacle 2230, for attaching the body 1510 of the tracking device 110 as depicted in FIGS. 15A, 15B and 15C, to the tracking portion attachment plate 2210. FIG. 22A further depicts various possible locations of the at least one tracking portion fastener receptacle 2230. In embodiments which comprise a single tracking portion fastener receptacle 2230, the single tracking portion fastener receptacle 2230 may be located at the centre of the tracking portion attachment plate 2210, along the central axis 2215. In other embodiments, the at least one tracking portion fastener receptacle 2230 may be located adjacent to an edge of the tracking portion attachment plate 2210 and configured to be accessible when the tracking portion attachment plate 2210 is clamped between the plate 1430 and the face 1420. Further, in embodiments where the tracking portion attachment plate 2210 comprises a plurality of tracking portion fastener receptacles 2230, the locations of the plurality of tracking portion fastener receptacles 2230 may be configured with rotational symmetry. However, in other embodiments, the locations of the plurality of tracking portion fastener receptacles 2230 may not be configured with rotational symmetry, as long as the balanced rotation of wheel assembly is maintained, for example via the use of counter-weights.

Figure 22B:
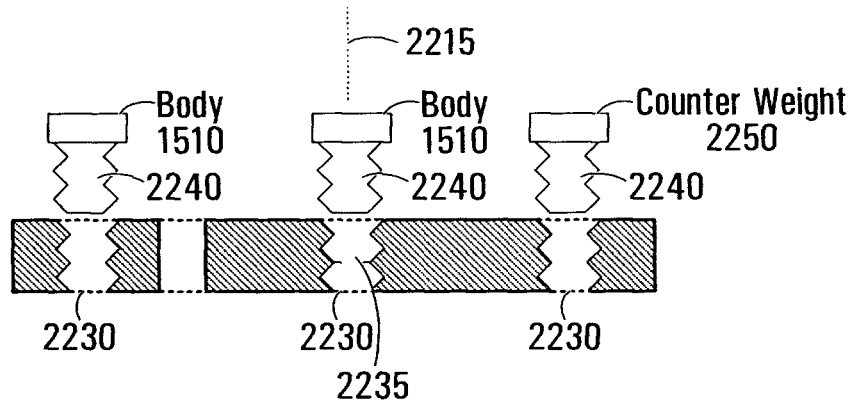

FIG. 22B depicts a cross-section through line BB of FIG. 22A, showing one embodiment of an attachment mechanism for attaching the body 1510 to the tracking portion attachment plate 2210. Within this embodiment, a threaded shaft 2240 extends from the body 1510, and the at least one tracking portion fastener receptacle 2230 comprises a threaded bore 2235, for receiving the threaded shaft 2240. The threaded shaft 2240 may be screwed into the threaded shaft 2235, attaching the body 1510 to the tracking portion attachment plate 2210.

FIG. 22B also depicts a counterweight 2250 for countering the weight of the body 1510, in embodiments where the body 1510 is attached to the tracking portion attachment plate 2210 at a tracking portion fastener receptacle 2230 that is not located along the central axis 2215. In this embodiment the counterweight 2250 may be attached to the tracking portion attachment plate 2210 at a location which counters the weight of the body 1510, so as to maintain the balanced rotation of the wheel assembly component, when the wheel assembly component is rotating, for example, at another tracking portion fastener receptacle 2230. In the depicted embodiment, the counterweight 2250 is attachable to the tracking portion attachment plate 2210 via an attachment mechanism similar to the attachment mechanism described above in relation to the body 1510. In other embodiments, the counterweight 2250 may be attachable to the tracking portion attachment plate 2210 via a different attachment mechanism. In some embodiments, the counterweight 2250 may be permanently attached to the tracking portion attachment plate 2210, or comprise a part of plate 2210.

In some embodiments (not depicted), the attachment member depicted in FIG. 22A may further comprise areas surrounding the at least one tracking portion fastener receptacle 2230 that are raised, to facilitate the displacement of the tracking portion 1530 from the wheel assembly component, as described earlier.

Figure 23:
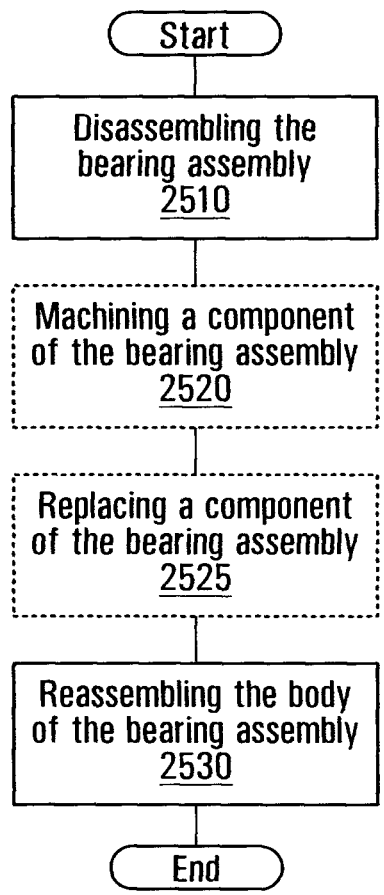
FIG. 23 depicts a method of refurbishing a bearing assembly, according to an embodiment of the present invention.

A method of refurbishing the bearing assembly 160 will now be described with reference to FIG. 23. In order to assist in the explanation of the method, it will be assumed that the method of FIG. 23 is operated using any of the embodiments of the tracking device 110 depicted in FIGS. 14-22B, or any embodiments of the plate 1430 depicted in FIG. 14 or 18. It should be understood that the steps in the method of FIG. 23 need not be performed in the sequence shown. Further, it is to be understood that the tracking devices of FIGS. 14-22 and/or the plates of FIGS. 14 and 19, and/or the method of FIG. 23 can be varied, and need not work as discussed herein in conjunction with each other, and that such variations are within the scope of the present invention.

At step 2510, some embodiments comprise disassembling the bearing assembly 160. In one non-limiting embodiment, the bearing assembly 160 comprises a plurality of components, which includes the bearing assembly body 1410, and the plate 1430. The bearing assembly 160 further comprises components which rotate relative to one another, for example the vehicle frame portion and the wheel portion, described previously. To facilitate the rotation between them, the vehicle frame portion and the wheel portion may be in contact via a bearing portion as known to one of skill in the art. In some embodiments, disassembling of the bearing assembly may be triggered by the bearing portion requiring maintenance, as indicated by a bearing assembly 160 that heats up while in use, as discussed previously. In any event, disassembling the bearing assembly 160 comprises separating the various components by loosening and/or removing fastening devices, etc.

At step 2520, some embodiments may comprise machining at least one component of the bearing assembly 160. In one non-limiting embodiment, machining at least one component of the bearing assembly 160 comprises machining the bearing portion to remove rough spots. However, in other embodiments, machining at least one component of the bearing assembly 160 may comprise machining another component to facilitate the rotation of the wheel portion relative to the vehicle frame portion.

At step 2525, some embodiments may comprise replacing at least one component of the bearing assembly. In one non-limiting embodiment, replacing at least one component of the bearing assembly 160 comprises replacing the bearing portion, if its condition has degraded to the point where it cannot be fixed with machining. However, in other embodiments, replacing at least one component of the bearing assembly 160 may comprise replacing another component to facilitate the rotation of the wheel portion relative to the vehicle frame portion.

At step 2530, some embodiments comprise reassembling the bearing assembly 160. In some embodiments, reassembling the bearing assembly 160 comprises reassembling the vehicle portion, the wheel portion and the bearing portion. In some non-limiting embodiments, reassembling the bearing assembly 160 further comprises clamping the tracking device 110 between a plurality of components of the bearing assembly 160. In some embodiments, the clamping of the tracking device 110 between a plurality of components of the bearing assembly 160 comprises clamping the tracking device 110 between the plate 1430 and the face 1420, as described previously with reference to FIGS. 14 to 15D. Other options described previously with reference to FIGS. 16 to 22B may also be utilized.

Those skilled in the art will appreciate that certain functionality of the computing entity 140, the reader 130, the tracking device 110 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the computing entity 140, the reader 130, the tracking device 110 and/or other elements may be implemented as an arithmetic and logic unit (ALU) having access to a code memory (not shown) which stores program instructions for the operation of the ALU. The program instructions could be stored on a medium which is fixed, tangible and readable directly by the computing entity 140, the reader 130, the tracking device 110 and/or other elements, (e.g., removable diskette, CD-ROM, ROM, fixed disk, USB drive), or the program instructions could be stored remotely but transmittable to the computing entity 140, the reader 130, the tracking device 110 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

I claim:

1. A device for tracking a rotatable object, the rotatable object comprising a face and a plate attachable to the face, the device comprising:
   a body comprising a tracking portion and a distal end, the body further comprising an abutment end configured for abutment against the rotatable object; and
   an attachment section connected to said body for attaching said device to the rotatable object, said attachment section projecting from said abutment end and comprising at least two arms, a portion of each of said at least two arms being bendable around an edge of the plate, said body and said attachment section being configured for balanced rotation when the rotatable object rotates.

2. The device of claim 1, said body having a rotational axis, said body being symmetric about said rotational axis, and said attachment section being symmetric about said rotational axis.

3. The device of claim 1, said tracking portion comprising an electronic tracking portion, and said electronic tracking portion being located sufficiently close to said distal end to allow readability by a tracking device reader, when said device is attached to the rotatable object.

4. The device of claim 1, said distal end being insertable through an opening in the plate, said abutment end configured for abutment against the face, and said attachment section configured to be clamped between the face and the plate, when said distal end is inserted through the opening.

5. The device of claim 4, wherein the at least two arms secure said device to the plate when said distal end is inserted through the opening of the plate and said portion of each of said at least two arms is bent around the edge of the plate.

6. The device of claim 1, said abutment end configured for abutment against an outer surface of the plate, said portion of each of said at least two arms being configured to be clamped between the face and an inner surface of the plate, opposite the outer surface, when said portion is bent around the edge of the plate.

7. The device of claim 1, said body having a rotational axis, said at least two arms projecting radially from said body, and said at least two arms being symmetrically configured about said rotational axis.

8. The device of claim 7, wherein said at least two arms are flush with said abutment end.

9. The device of claim 1, said body being detachably connected to said attachment section via a first attachment mechanism.

10. The device of claim 9, said first attachment mechanism comprising at least one threaded shaft extending from one of said body and said attachment section, and said first attachment mechanism further comprising at least one threaded bore for receiving said at least one threaded shaft, located in the other of said body and said attachment section.

11. The device of claim 9, the rotatable object comprising a face and a plate attachable to the face, said body being insertable through an opening in the plate, and said attachment section being configured to be clamped between the face and plate when said body is inserted through the opening.

12. The device of claim 1, said tracking portion being configured to store data associated with the rotatable object.

13. The device of claim 12, said data associated with the rotatable object comprising an identification number of the rotatable object.

14. The device of claim 13, said data associated with the rotatable object further comprising at least one of: a configuration of the rotatable object, data associated with an environment of the rotatable object, and data conveying a history of the rotatable object.

15. A device for tracking a rotatable object, the rotatable object comprising a face and a plate attachable to the face, the device comprising:
a body comprising a tracking portion, said body having a rotational axis, said body being symmetric about said rotational axis, said body being insertable through an opening in the plate; and
an attachment section connected to said body for attaching said device to the rotatable object, said body and said attachment section being configured for balanced rotation when the rotatable object rotates, said attachment section being symmetric about said rotational axis, said attachment section comprising a web portion projecting from said body, substantially perpendicular to said rotational axis, and said web portion being configured to be clamped between the face and the plate when said body is inserted through the opening.

16. The device of claim 15, further comprising a counterweight connected to said attachment section, said counterweight being configured to balance the weight of said body when the rotatable object rotates.

17. The device of claim 15, further comprising a counterweight detachably connectable to the plate via a second attachment mechanism, said counterweight being configured to balance the weight of said body when the rotatable object rotates.

18. The device of claim 15, further comprising a counterweight detachably connected to said attachment section via a second attachment mechanism, said counterweight being configured to balance the weight of said body when the rotatable object rotates.

19. A system, comprising:
a rotatable object comprising:
a face; and
a plate releasably attached to said face; and
a tracking device attached to said rotatable object, said tracking device comprising:
a body comprising a tracking portion, said body comprising an abutment end abutting the rotatable object and a distal end extending away from said rotatable object; and
an attachment section projecting from said abutment end of said body, said attachment section comprising at least two arms, a portion of each of said at least two arms being bent around an edge of the plate wherein at least a portion of said attachment section is clamped between said face and said plate with sufficient force to prevent said tracking device from being released while said rotatable object is rotating.

20. The system of claim 19, said body being symmetric about a rotational axis of said rotatable object, and said attachment section being symmetric about said rotational axis.

21. The system of claim 20, said body comprising a cylinder having a cylindrical axis, and said rotational axis corresponding to the cylindrical axis of said cylinder.

22. The system of claim 19, said body being elongate, and said tracking portion located closer to said distal end than said abutment end.

23. The system of claim 22, said tracking portion comprising an electronic tracking portion, and said electronic tracking portion being located sufficiently close to said distal end to allow readability by a tracking device reader.

24. The system of claim 19, said distal end extending through an opening in the plate, said abutment end abutting the face.

25. The system of claim 19, said abutment end configured for abutment against an outer surface of the plate, said portion of each of said at least two arms clamped between the face and an inner surface of the plate, opposite the outer surface.

26. The system of claim 19, said body further comprising a shell, wherein said shell comprises plastic.

27. The system of claim 26, wherein said tracking portion is imbedded in said shell.

28. The system of claim 19, said body having a rotational axis, said at least two arms projecting radially from said body, and said at least two arms being symmetrically configured about said rotational axis.

29. The system of claim 28, said attachment section comprising two arms, wherein an angle between adjacent arms is approximately 180°.

30. The system of claim 28, said attachment section comprising three arms, wherein an angle between adjacent arms is approximately 120°.

31. The system of claim 28, said at least two arms extending from the abutment end of the body, said abutment end abutting the rotatable object, wherein said at least two arms are flush with said abutment end.

32. The system of claim 31, each of said at least two arms having a given length, a given width, and a given thickness, said given thickness being substantially uniform.

33. The system of claim 31, said given thickness being substantially less than said given length.

34. The system of claim 28, wherein each of said at least two arms comprise aluminum.

35. The system of claim 19, said body being detachably connected to said attachment section via a first attachment mechanism.

36. The system of claim 35, said first attachment mechanism comprising at least one threaded shaft extending from one of said body and said attachment section, and said first attachment mechanism further comprising at least one threaded bore for receiving said at least one threaded shaft, located in the other of said body and said attachment section.

37. The system of claim 35, further comprising a counterweight connected to said attachment section, said counter weight being configured to balance the weight of said body when the rotatable object rotates.

38. The system of claim 35, further comprising a counterweight connected to said plate via a second attachment mechanism, said counter weight being configured to balance the weight of said body when the rotatable object rotates.

39. The system of claim 38, wherein said counter weight is detachably connected to said plate.

40. The system of claim 35, further comprising a counterweight detachably connected to said attachment section via a second attachment mechanism, said counter weight being configured to balance the weight of said body when the rotatable object rotates.

41. The system of claim 40, wherein said second attachment mechanism is substantially similar to said first attachment mechanism.

42. The system of claim 19, said tracking portion being configured to store data associated with the rotatable object.

43. The system of claim 42, said data associated with the rotatable object comprising an identification number of the rotatable object.

44. The system of claim 43, said data associated with the rotatable object further comprising at least one of: a configuration of the rotatable object, data associated with an environment of the rotatable object, and data conveying a history of the rotatable object.

45. The system of claim 19, said rotatable object comprising a wheel assembly component.

46. A system, comprising:
a rotatable object comprising:
a face; and
a plate releasably attached to said face; and
a tracking device attached to said rotatable object, said tracking device comprising:
a body comprising a tracking portion, said body being symmetric about a rotational axis of said rotatable object; and
an attachment section projecting from said body, said attachment section being symmetric about said rotational axis, wherein at least a portion of said attachment section is clamped between said face and said plate with sufficient force to prevent said tracking device from being released while said rotatable object is rotating,
said attachment section comprising a web portion, projecting from said body, substantially perpendicular to said rotational axis.

47. The system of claim 46, said body extending through an opening in said plate, and said web portion clamped between said face and said plate.

48. A method of attaching a tracking device to a rotatable object, the rotatable object comprising a face and a plate attachable to the face, the tracking device comprising an attachment section, comprising:
positioning at least a portion of the attachment section between the face and the plate; and
attaching the plate to the face to clamp the at least a portion of the attachment section between the face and the plate,
wherein said positioning the attachment section between the face and the plate further comprises affixing the tracking device to the plate by bending at least a portion of the attachment section around an edge of the plate.

49. The method of claim 48, wherein the at least a portion of the attachment section is clamped between the face and the plate with sufficient force to prevent the tracking device from being released while the rotatable object is rotating.

50. The method of claim 48, wherein said positioning at least a portion of the attachment section between the face and the plate comprises placing the at least a portion of the attachment section against a rotatable object side surface of the plate.

51. The method of claim 48, wherein the tracking device further comprises a body comprising:
an abutment end configured for abutment against the face, the attachment section projecting from said abutment end; and
a distal end insertable through an opening in the plate,
said affixing the tracking device to the plate further comprising inserting the distal end through the opening, prior to bending the at least a portion of the attachment section around the edge of the plate.

52. The method of claim 48, wherein the tracking device further comprises a body comprising:
an abutment end configured for abutment against an outer surface of the plate, the outer surface of the plate being opposite a bearing assembly side surface of the plate, the attachment section projecting from the abutment end,
said affixing the tracking device to the plate further comprising placing the abutment end against the outer surface of the plate, prior to bending the at least a portion of the attachment section around the edge of the plate.

53. The method of claim 48, wherein the tracking device further comprises a body comprising:
an abutment end configured for abutment against the face, the attachment section projecting from the abutment end; and
a distal end insertable through an opening in the plate,
said positioning at least a portion of the attachment section between the face and the plate comprising placing the abutment end against the face, so as to align the body with the opening in the plate, when the plate is attached to the face.

54. The method of claim 53, wherein said placing the abutment end against the face further comprises aligning a rotational axis of the tracking device with a rotational axis of the rotatable object.

55. The method of claim 48, wherein said attaching the plate to the face comprises aligning a rotational axis of the plate with a rotational axis of the rotatable object.

56. The method of claim 55, wherein the rotatable object further comprises an attachment mechanism for attaching the plate to the face, the attachment mechanism comprising a plate portion and a face portion, and attaching the plate to the face comprises aligning the plate portion with the face portion.

57. The method of claim 56, wherein the attachment mechanism comprises at least one bolt, the plate portion comprising at least one hole in the plate for inserting therethrough a threaded shaft of the at least one bolt, the at least one hole having a diameter less than a head of the at least one bolt, the face portion comprising at least one threaded bore for receiving the threaded shaft, and attaching the plate to the face comprises:

inserting the threaded shaft through the at least one hole and into the at least one threaded bore; and tightening the bolt to a given torque.

\* \* \* \* \*